(12) United States Patent
Takahashi

(10) Patent No.: US 8,463,434 B2
(45) Date of Patent: Jun. 11, 2013

(54) ROBOT HAND AND CONTROL SYSTEM, CONTROL METHOD AND CONTROL PROGRAM FOR THE SAME

(75) Inventor: Kazuyuki Takahashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 540 days.

(21) Appl. No.: 12/779,287

(22) Filed: May 13, 2010

(65) Prior Publication Data
US 2010/0292842 A1 Nov. 18, 2010

(30) Foreign Application Priority Data

May 14, 2009 (JP) ................................ 2009-117776

(51) Int. Cl.
*G06F 19/00* (2006.01)
(52) U.S. Cl.
USPC ...... 700/245; 700/258; 700/260; 318/568.16; 318/568.21; 318/568.2; 901/33; 901/34; 623/64
(58) Field of Classification Search
USPC ................. 700/245, 250, 254, 258, 260, 262; 318/568.11, 568.12, 568.16, 568.2, 568.21; 901/1, 9, 30, 33, 34, 38; 623/64, 65
See application file for complete search history.

(56) References Cited

U.S. PATENT DOCUMENTS

| | | | | |
|---|---|---|---|---|
| 4,367,891 A | * | 1/1983 | Wauer et al. | 294/197 |
| 4,821,594 A | * | 4/1989 | Rosheim et al. | 74/490.05 |
| 4,980,626 A | * | 12/1990 | Hess et al. | 318/568.16 |
| 5,373,747 A | * | 12/1994 | Ogawa et al. | 73/862.581 |
| 5,501,498 A | * | 3/1996 | Ulrich | 294/106 |
| 5,967,580 A | * | 10/1999 | Rosheim | 294/198 |
| 6,517,132 B2 | * | 2/2003 | Matsuda et al. | 294/106 |
| 6,817,641 B1 | * | 11/2004 | Singleton, Jr. | 294/106 |
| 7,168,748 B2 | * | 1/2007 | Townsend et al. | 294/106 |
| 7,549,688 B2 | * | 6/2009 | Hayakawa et al. | 294/106 |
| 7,787,993 B2 | * | 8/2010 | Takahashi | 700/262 |
| 2007/0018470 A1 | * | 1/2007 | Hayakawa et al. | 294/106 |

(Continued)

FOREIGN PATENT DOCUMENTS

| | | |
|---|---|---|
| JP | 2003-245883 | 9/2003 |
| JP | 2009-066714 | 4/2009 |

OTHER PUBLICATIONS

Gunji et al., Grasping Force Control of Multi-fingered Robot Hand based on Slip Detection Using Tactile Sensor, 2008 IEEE International Conference on Robotics and Automation Pasadena, CA, USA, May 19-23, 2008, pp. 2605-2610.*

(Continued)

*Primary Examiner* — Dalena Tran
*Assistant Examiner* — Jamie Figueroa
(74) *Attorney, Agent, or Firm* — Rankin, Hill & Clark LLP

(57) ABSTRACT

A system is capable of controlling the movements of a hand so as to ensure a further stable grasp of an object. In a state wherein an object is in contact with a plurality of finger mechanisms and a palm portion by being grasped by the hand, the load to be applied to the object from each of the plurality of finger mechanisms can be adjusted. Thus, the position of the load center on the palm portion can be displaced so as to be included in a target palm area. Further, the load to be applied to the palm portion can be adjusted so as to fall within a target load range.

7 Claims, 14 Drawing Sheets

U.S. PATENT DOCUMENTS

| | | | | |
|---|---|---|---|---|
| 2007/0236162 | A1* | 10/2007 | Kawabuchi et al. | 318/568.16 |
| 2009/0069942 | A1* | 3/2009 | Takahashi | 700/260 |
| 2009/0302626 | A1* | 12/2009 | Dollar et al. | 294/106 |
| 2010/0138039 | A1* | 6/2010 | Moon et al. | 700/245 |
| 2010/0161130 | A1* | 6/2010 | Kim et al. | 700/261 |

OTHER PUBLICATIONS

Yu et al., Optimization of Robot Hand Power Grasps, Proceedings of the 1998 IEEE International Conference on Robotics & Automation Leuven, Belgium May 1998, pp. 3341-3347.*

Bekey et al., Knowledge-Based Control of Grasping in Robot Hands Using Heuristics from Human Motor Skills, 1993 IEEE Transactions on Robotics and Automation, vol. 9, No. 6, Dec. 1993, pp. 709-722.*

Edin et al., Bio-inspired sensorization of a biomechatronic robot hand for the grasp-and-lift task, 2008, Brain Research Bulletin 75, Elsevier, pp. 785-795.*

Zhang et al., Under-actuated passive adaptive grasp humanoid robot hand with control of grasping force, 2003 Proceedings of the IEEE International Conference on Robotics & Automation Taipei, Taiwan, Sep. 14-19, 2003, pp. 696-701.*

Hor et al., On the grasping stability and optimality under external perturbations, 1995 IEEE International Conference on Systems, Man and Cybernetics, Intelligent Systems for the 21st Century, pp. 934-939, vol. 1.*

Tomovic et al., A strategy for grasp synthesis with multifingered robot hands, 1987 Proceedings IEEE International Conference onRobotics and Automation, vol. 4, pp. 83-89.*

* cited by examiner

- PRESSURE IS SENSED
- NO PRESSURE IS SENSED

- PRESSURE IS SENSED
- NO PRESSURE IS SENSED

ROBOT HAND AND CONTROL SYSTEM, CONTROL METHOD AND CONTROL PROGRAM FOR THE SAME

BACKGROUND OF THE INVENTION

1. Field of the Invention

The present invention relates to a robot hand which is provided with a palm and a plurality of fingers extended from the palm and which carries out an operation of holding an object by adjusting the position and the posture of the palm and by moving each of the plurality of fingers.

2. Description of the Related Art

A technique for controlling the movement of a robot hand to hold an object has been proposed (refer to Japanese Patent Application Laid-Open No. 2003-245883). More specifically, first, an arm is moved to cause a palm portion to come in contact with an object at the central position of the palm portion. Then, the movements of the arm and each of a plurality of finger mechanisms are controlled such that the force of contact between the plurality of finger mechanisms and the object agrees with a target force.

However, there is a case where after the object first comes in contact with the plurality of finger mechanisms, the object is pressed against the palm portion by the movements of the plurality of finger mechanisms, causing the object to be held between the plurality of finger mechanisms and the palm portion. In this case, there is a possibility that the object is in contact with the palm portion in a manner inappropriate for ensuring a stable grasp of the object.

SUMMARY OF THE INVENTION

Hence, an objective of the present invention is to provide a system and the like capable of controlling the movement of a hand so as to ensure a more stable grasp of an object.

To this end, a control system in accordance with the present invention is a control system of a robot hand which is provided with a palm portion and a plurality of finger mechanisms extended from the palm portion and which is capable of grasping an object by moving the plurality of finger mechanisms, the control system including: a first arithmetic processor which measures the position of a load center in the palm portion and a load applied to the palm portion; and a second arithmetic processor which controls a finger pressure, which is a load applied to the object from each of the plurality of finger mechanisms, such that a measurement position of a load center in the palm portion is included in a target palm area and a measurement value of the load applied to the palm portion is included in a target load range in a state wherein the object is in contact with the plurality of finger mechanisms and the palm portion, respectively, by being grasped by the hand.

The control system in accordance with the present invention makes it possible to adjust a finger pressure, which is a load applied to an object from each of the plurality of finger mechanisms in a state wherein the object is in contact with the plurality of finger mechanisms and the palm portion, respectively, by being grasped by the hand. With this arrangement, if the object is held in a manner inappropriate for ensuring a stable grasp, e.g., if the position of the load center in the palm portion is out of a target palm area in the aforesaid state, that is, if the load distribution on the palm portion is excessively uneven, then the position of the load center can be changed so as to be included in the target palm area. Further, if the object is held in a manner inappropriate for the object to be stably held due to the deviation of a load applied to the palm portion in the aforesaid state from a target load range, that is, due to a load applied to the palm portion being too weak, then the load can be adjusted so as to fall within the target load range.

Hence, even if the load distribution on the palm portion is excessively uneven as described above, the movement of the hand, including the movements of the plurality of finger mechanisms, can be controlled such that the object may be grasped stably.

The term "load" applied to the palm portion means a load at the center thereof and other specified location and also means a mean value or a cumulative value of loads at a plurality of locations of the palm portion. The term "the recognition" of information by a constituent element in the present invention means that the constituent element of a hardware resource of a computer, such as a CPU, carries out any type of arithmetic processing of information to prepare the information so as to be available for arithmetic processing or the like requiring the information. This includes the constituent element reading information from a storage device, searching for information in a database, receiving information, and measuring, calculating, estimating or predicting information by executing arithmetic processing, as necessary, on the basis of basic information output from sensors, and storing information in the storage device.

In the case where the first arithmetic processor measures, as a finger position, a position at which each of the plurality of finger mechanisms is in contact with the object and which is projected onto the palm portion in a direction of a finger pressure, and the first arithmetic processor measures three or more finger positions, the second arithmetic processor may set the target palm area such that the target palm area falls within a triangle having a finger position or an intermediate position of a pair of finger positions as an apex thereof, adjust a relative magnitude of the finger pressure of a single finger mechanism or the resultant force of a pair of finger mechanisms corresponding to one end of a long side of the triangle and the finger pressure of a single finger mechanism or the resultant force of a pair of finger mechanisms corresponding to the other end of the long side of the triangle thereby to displace the load center in the palm portion in a direction parallel to the long side, and adjust the relative magnitude of the finger pressure of a single finger mechanism or the resultant force of a pair of finger mechanisms corresponding to the apex of the triangle opposing the long side and the resultant force of the finger pressures of the plurality of finger mechanisms corresponding to both ends of the long side, thereby changing the load center in the palm portion in a direction perpendicular to the long side.

In the case where the first arithmetic processor measures two finger positions, the second arithmetic processor may set an region, which expands using an intermediate position of a reference line segment connecting the two finger positions as a reference point thereof, as the aforesaid target palm area and displace the load center of the palm portion in the direction parallel to the reference line segment by adjusting the relative magnitude of the finger pressure of a single finger mechanism corresponding to one end of the reference line segment and the finger pressure of another finger mechanism corresponding to the other end of the reference line segment.

The first arithmetic processor may define a frictional circular cone having a position, at which a finger mechanism and an object are in contact, as the apex thereof and measure the finger position of the finger mechanism, provided that a finger pressure vector applied to the object from the finger mechanism passes the frictional circular cone.

The first arithmetic processor may measure the area of a whole region in which the palm portion and the object are in contact as a palm contact area and measure the finger position, provided that the palm contact area is a reference value or more.

A robot hand in accordance with the present invention for solving the aforesaid problem has a palm portion, a plurality of finger mechanisms extended from the palm portion, and one of the control systems described above.

A control program of the robot hand for solving the aforesaid problem causes a computer to function as any one of the control systems described above.

A control method of the robot hand in accordance with the present invention for solving the aforesaid problem is a control method of a robot hand which is provided with a palm portion and a plurality of finger mechanisms extended from the palm portion and which is capable of grasping an object by moving the plurality of finger mechanisms, whereby to measure the position of load center in the palm portion and a load applied to the palm portion and to control a finger pressure, which is a load applied to the object from each of the plurality of finger mechanisms, such that a measurement position of the load center on the palm portion is included in a target palm area and a measured value of the load applied to the palm portion is included in a target load range in a state wherein the object is in contact with the plurality of finger mechanisms and the palm portion, respectively, by being grasped by the hand.

DESCRIPTION OF THE PREFERRED EMBODIMENTS

An embodiment of the present invention will be described with reference to the accompanying drawings.

First, the construction of a robot having robot hands as constituent elements representing an embodiment of the present invention will be described.

Figure 1:
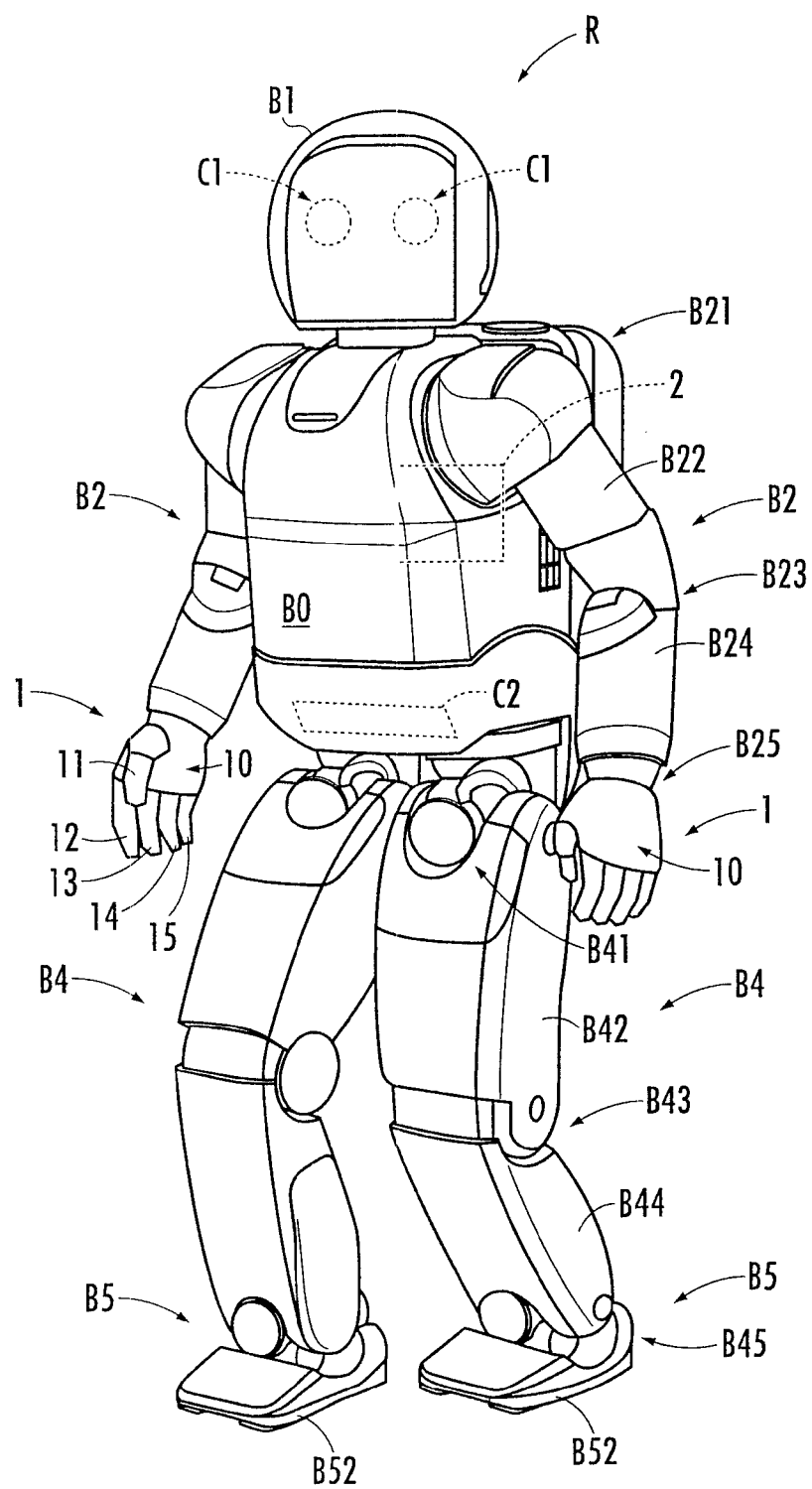
FIG. 1 is a graphical illustration of the construction of a robot having hands according to an embodiment of the present invention.

A robot R shown in FIG. 1 is a legged mobile robot. Like a human being, the robot R has a body B0, a head B1 disposed on the top of the body B0, right and left arms B2 extended from both sides of an upper portion of the body B0, hands 1 provided at the distal ends of the right and left arms B2, and right and left legs B4 extended downward from the bottom of the body B0. The robot R is not limited to the legged mobile robot but may also be any type of robot provided with mechanisms corresponding to the arms B2 for changing the positions and postures of the hands 1.

The robot R is provided with a controller 2 which controls the movements of the robot R. The controller 2 may be a decentralized controller constructed of a main control unit and a single or a plurality of subsidiary control units connected through an internal network of the robot R.

The body B0 is constituted of an upper portion and a lower portion vertically connected such that the upper and lower portions may circularly move relatively about a yaw axis. The head B1 is capable of moving, such as circularly moving about the yaw axis relative to the body B0. The head B1 has a pair of right and left head cameras C1 capable of sensing light in various frequency bands, such as CCD cameras or infrared cameras, the imaging range of which lies in an area in front of the robot R. A lower portion of the body B0 is provided with a waist camera (active sensor) C2 for measuring the position, orientation and the like of an object by detecting a near-infrared laser beam reflected from the object when the laser beam is emitted downward in front of the robot R.

Each of the arms B2 includes a first arm link B22 and a second arm link B24. The body B0 and the first arm link B22 are connected through the intermediary of a shoulder joint mechanism (a first arm joint mechanism) B21, and the first arm link B22 and the second arm link B24 are connected through the intermediary of an elbow joint mechanism (a second arm joint mechanism) B23, and the second arm link B24 and the hand 1 are connected through the intermediary of a wrist joint mechanism (a third arm joint mechanism) B25. The shoulder joint mechanism B21 has freedom of rotation about a roll axis, a pitch axis and a yaw axis. The elbow joint mechanism B23 has freedom of rotation about the pitch axis. The wrist joint mechanism B25 has freedom of rotation about the roll axis, the pitch axis, and the yaw axis.

Each of the legs B4 includes a first leg link B42, a second leg link B44, and a foot portion B5. The body B0 and the first leg link B42 are connected through the intermediary of a hip joint mechanism (a first leg joint mechanism) B41, the first leg link B42 and the second leg link B44 are connected through the intermediary of a knee joint mechanism (a second leg joint mechanism) B43, and the second leg link B44 and the foot portion B5 are connected through the intermediary of a foot joint mechanism (a third leg joint mechanism) B45.

The hip joint mechanism B41 has freedom of rotation about the roll axis, the pitch axis, and the yaw axis, the knee joint mechanism B43 has freedom of rotation about the pitch axis, and the foot joint mechanism B45 has freedom of rotation about the roll axis and the pitch axis. The hip joint mechanism B41, the knee joint mechanism B43, and the foot joint mechanism B45 constitute a group of leg joint mechanisms. The translational and rotational freedom of each joint mechanism included in the group of leg joint mechanisms may be changed, as necessary. As an alternative, any one joint mechanism of the hip joint mechanism B41, the knee joint mechanism B43, and the foot joint mechanism B45 may be omitted, and the remaining two joint mechanisms may be combined to constitute the group of leg joint mechanisms. Further, in the case where the leg B4 has a second leg joint mechanism in addition to the knee joint, the group of leg joint mechanisms may be formed such that the second leg joint mechanism is included therein. The bottom of the foot portion B5 is provided with an elastic member B52 disclosed in Japanese Patent Application Laid-Open No. 2001-129774 to alleviate an impact at the time of landing on a floor.

[Description of the Hands]

The construction of a hand 1 will now be described.

Figure 3:
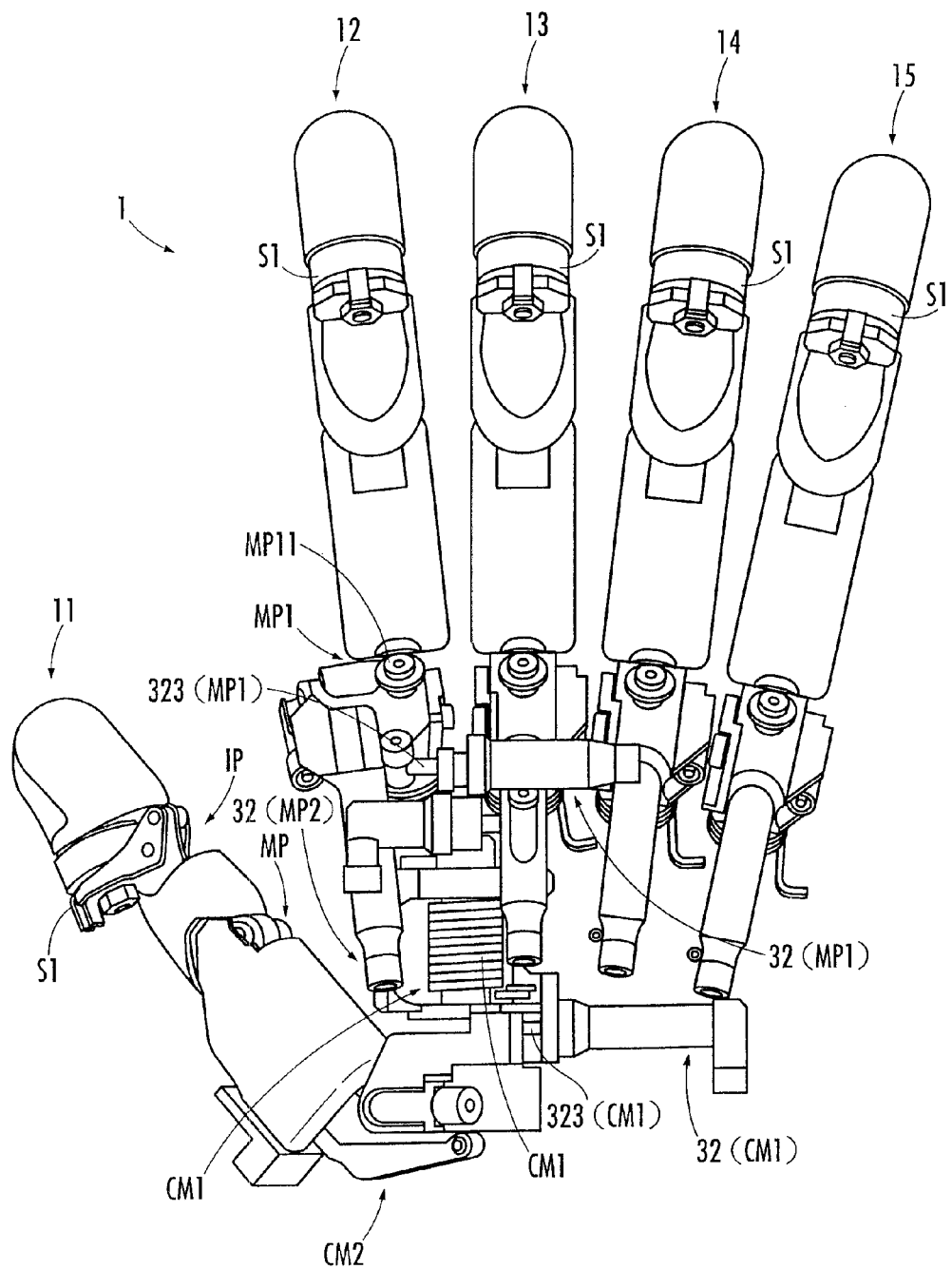
FIG. 3 is another graphical illustration of the hand.

The hand 1 has a palm portion 10 and five finger mechanisms 11 to 15 extended from the palm portion 10. The palm portion 10 has a frame 101 which connects and supports the finger mechanisms. The front side of the palm portion 10 is defined as the back of the hand, while the back side of thereof is defined as the palm. FIG. 3 illustrates the palm side of the hand 1. The palm portion 10 is covered by a palm portion epidermis member 102. The first finger mechanism 11, the second finger mechanism 12, the third finger mechanism 13, the fourth finger mechanism 14, and the fifth finger mechanism 15 correspond to the five fingers of a human hand, namely, the thumb, the index finger, the middle finger, the ring finger, and the little finger, respectively. Each of the finger mechanisms 11 to 15 are covered by a finger epidermis member (not shown), the joint thereof being exposed.

[Description of the First Finger Mechanism]

Figure 2:
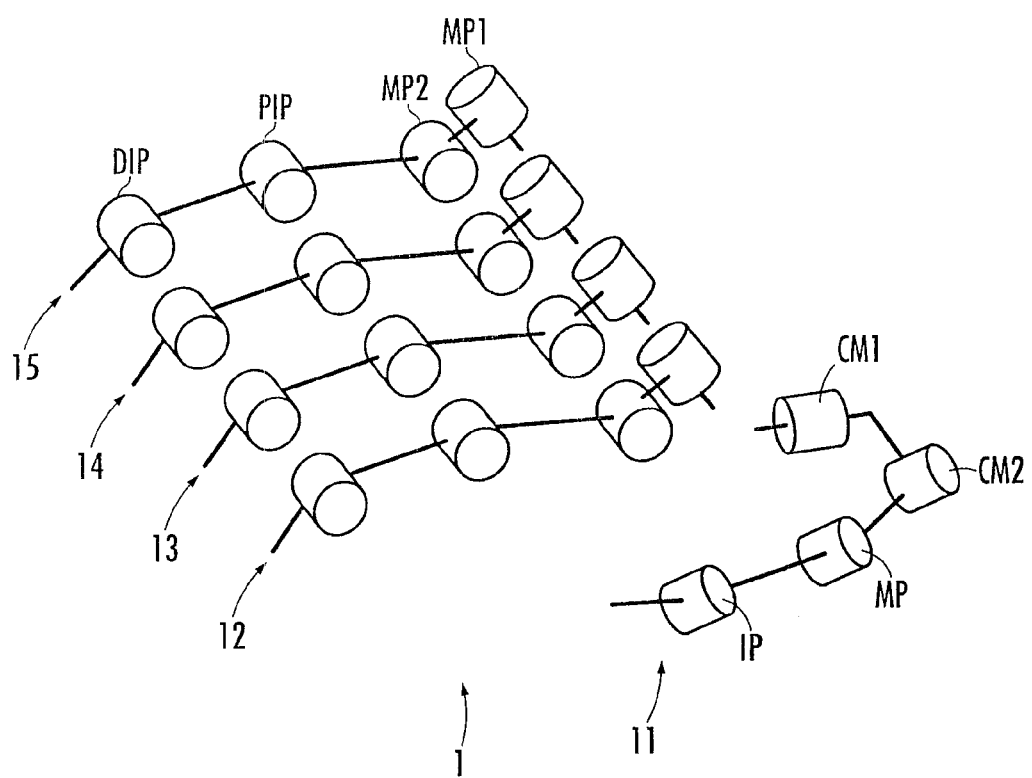
FIG. 2 is a graphical illustration of the construction of a hand.

As schematically illustrated in FIG. 2, the first finger mechanism 11 has a plurality of finger link members connected through the intermediary of a CM1 joint, a CM2 joint, an MP joint, and an IP joint in order from a link member fixed to the palm portion 10.

The CM1 joint and the CM2 joint constitute a wrist metacarpus joint mechanism having a 2-degree freedom of rotation. The CM1 joint and the CM2 joint rotate about axis lines orthogonal or approximately orthogonal to each other. The MP joint constitutes a thumb metacarpus finger dactylus joint mechanism having a 1-degree freedom of rotation. The IP joint constitutes a thumb interphalangeal articulations mechanism having a 1-degree freedom of rotation. The CM2 joint, the MP joint, and the IP joint rotate about axis lines that are parallel or approximately parallel to each other.

The first finger mechanism 11 bends and stretches as the CM2 joint, the MP joint, and the IP joint rotate, permitting a movement of, for example, bending toward the palm side of the palm portion 10. The CM1 joint rotates the first finger mechanism 11 such that the first finger mechanism 11 opposes the palm.

[Description of the Second to the Fifth Finger Mechanisms]

As schematically illustrated in FIG. 2, each of the finger mechanisms 11 to 15 has a plurality of finger link members connected through the intermediary of an MP1 joint, an MP2 joint, a PIP joint, and a DIP joint in order from a link member fixed to the palm portion 10.

The MP1 joint and the MP2 joint constitute a metacarpus finger dactylus joint mechanism having a 2-degree freedom of rotation. The MP1 joint and the MP2 joint rotate about axis lines orthogonal to each other. The PIP joint constitutes a proximal interphalangeal articulations joint mechanism having a 1-degree freedom of rotation. The DIP joint constitutes a distal interphalangeal articulations joint mechanism having a 1-degree freedom of rotation. The MP2 joint, the PIP joint, and the DIP joint rotate about axis lines parallel or approximately parallel to each other.

Each of the finger mechanisms 12 to 15 bends and stretches as the MP2 joint, the PIP joint, and the DIP joint rotate, permitting a movement of, for example, bending toward the palm side of the palm portion 10. The MP1 joint swings each of the finger mechanisms 11 to 15 such that the finger mechanisms 11 to 15 move toward each other or away from each other, permitting a movement of, for example, spreading a hand like a human being does.

[Description of Sensors]

Figure 4:
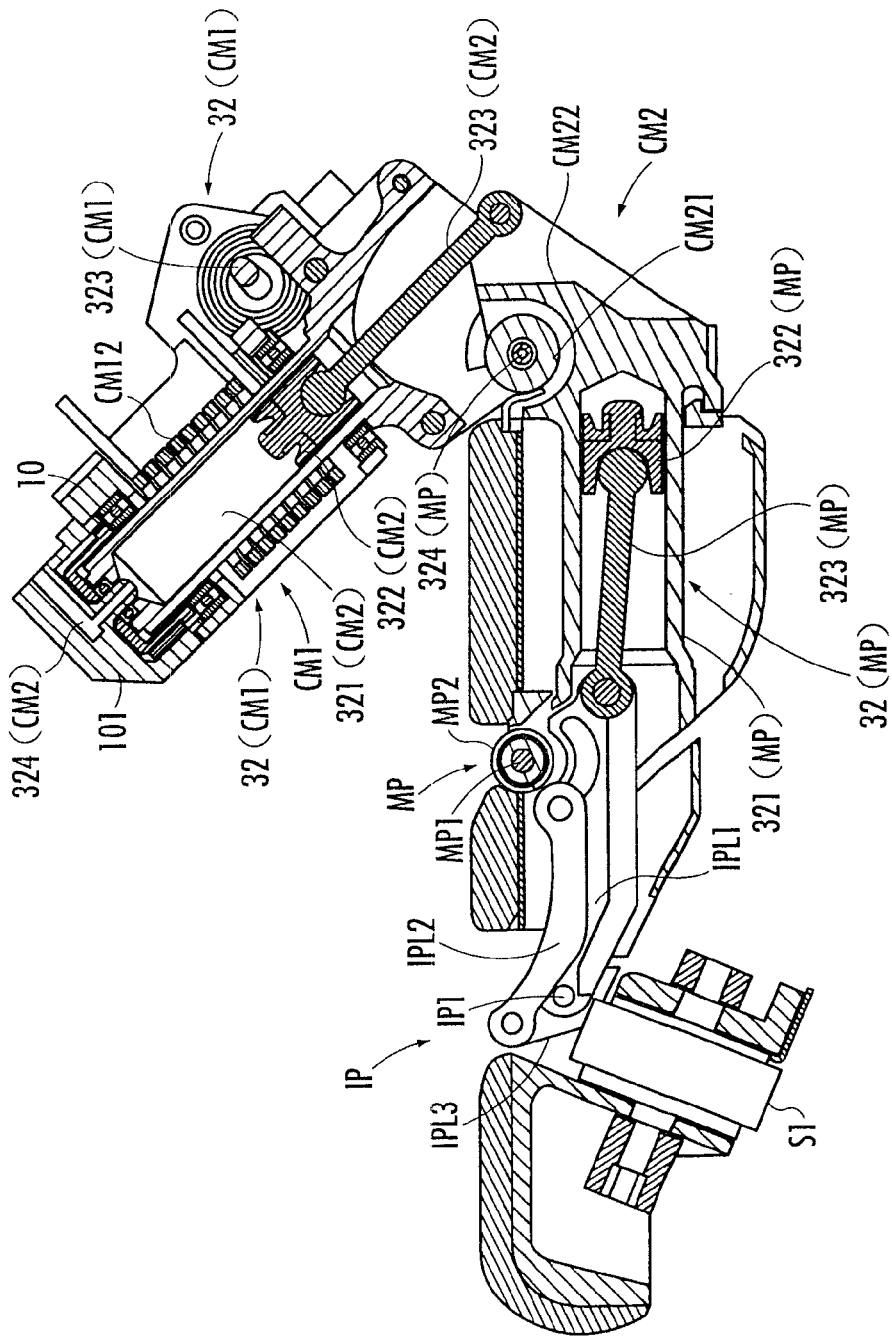
FIG. 4 is a graphical illustration of a first finger mechanism of the hand.
Figure 5:
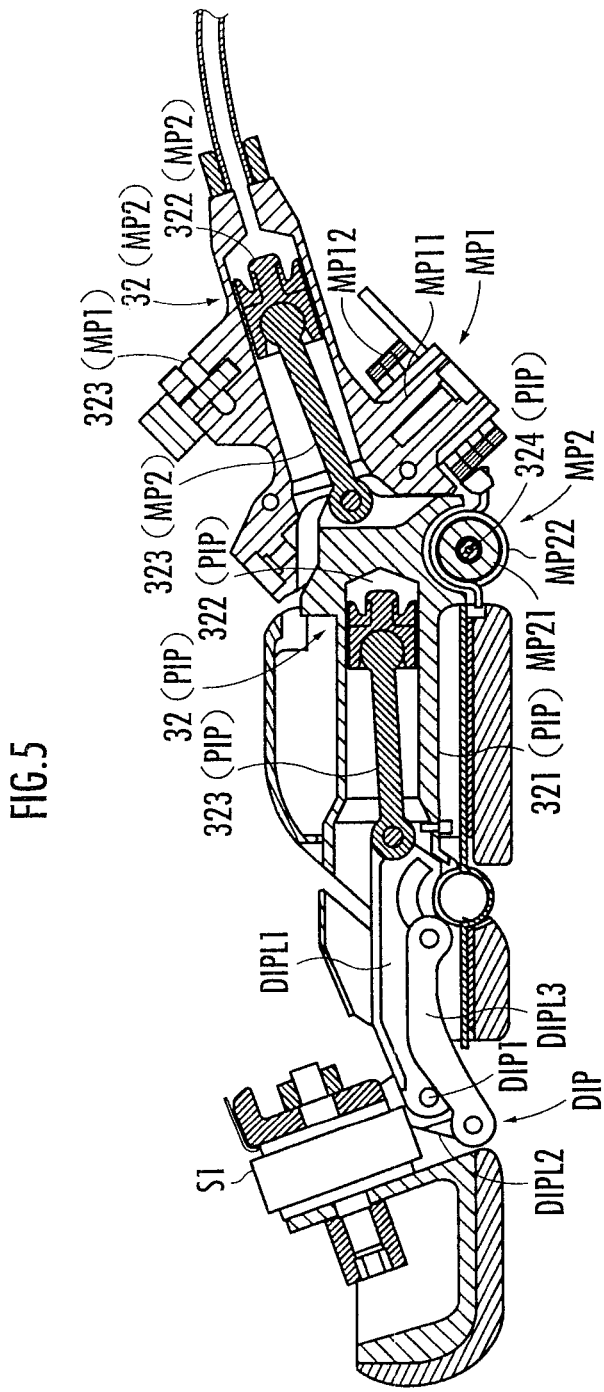
FIG. 5 is a graphical illustration of a second finger mechanism of the hand.

As illustrated in FIG. 3 and FIG. 4 or FIG. 5, each of the finger mechanisms 11 to 15 has a 6-axis force sensor S1. The 6-axis force sensor S1 is installed aslant on a fingertip member of each finger mechanism. The 6-axis force sensor S1 measures the forces of six axes acting on the fingertip member of each finger mechanism, namely, the translational forces in three axes (an x-axis, a y-axis, and a z-axis), which are orthogonal to each other, and the moment about each of the axes. The magnitude, the direction and the like of the force at each finger mechanism are controlled on the basis of the measured values of the 6-axis forces output from the 6-axis force sensor S1.

A plurality of locations on the palm of the palm portion 10 is provided with pressure sensors S2, which issue signals based on loads or pressures at the locations. Alternatively, a plurality of locations of the finger pad of each of the finger mechanisms 11 to 15 may be provided with the pressure sensors S2, which output signals based on the load or pressure at each location, in the same manner as described above.

[Description of a First Type of Finger Mechanism (Manipulating Finger) and a Second Type of Finger Mechanism (Power Finger)]

The five finger mechanisms 11 to 15 are classified into a first type of finger mechanisms and a second type of finger mechanisms according to the level of freedom degree of active movements. The first finger mechanism 11, the second finger mechanism 12, and the third finger mechanism 13 are classified as the first type of finger mechanisms having higher degrees of freedom. The fourth finger mechanism 14 and the fifth finger mechanism 15 are classified as the second type of finger mechanisms having lower degrees of freedom, as compared with the first type of finger mechanisms.

[Description of the First Type of Finger Mechanisms]

[Construction of the Finger Mechanism]

The first finger mechanism 11 classified as the first type of finger mechanisms has a first driven fluid pressure cylinder 32 (CM2) for rotating a rotational shaft CM21 of the CM2 joint (a second rotational shaft of the wrist metacarpus joint mechanism) and a second driven fluid pressure cylinder 32 (MP) for rotating the rotational shaft MP1 of the MP joint, as illustrated in FIG. 4.

A cylinder main body 321 (CM2) of the first driven fluid pressure cylinder 32 (CM2) provides the rotational shaft of the CM1 joint (a second rotational shaft of the wrist metacarpus joint) and is rotatively supported by the frame 101 of the palm portion 10.

Thus, using the cylinder main body 321 (CM2) of the first driven fluid pressure cylinder 32 (CM2) also as the CM1 joint rotational shaft achieves a compact construction, as compared with the case where the first driven fluid pressure cylinder 32 (CM2) and the rotational shaft of the CM1 joint are separately provided. Moreover, there is no swing of the first driven fluid pressure cylinder 32 (CM2) as the CM1 joint rotates, thus obviating the need for a swinging space. This permits an extremely compact construction.

The cylinder main body 321 (MP) of the second driven fluid pressure cylinder 32 (MP) is rotatively connected to the first driven fluid pressure cylinder 32 (CM2) through the intermediary of the rotational shaft CM21 of the CM2 joint.

A pipe 324 (MP) for supplying a fluid to the cylinder main body 321 (MP) of the second driven fluid pressure cylinder 32

(MP) is accommodated in the rotational shaft CM21 of the CM2 joint. This allows the first finger mechanism 11 to bend and stretch smoothly without being interfered by the pipe 324 (MP) when the CM2 joint rotates.

The IP joint is connected to the MP joint through the intermediary of a connecting member IPL1. The fingertip member is rotatively connected to a rotational shaft IP1 of the IP joint. One end of the connecting member IPL1 is rotatively connected to the rotational shaft MP1 of the MP joint, while the other end thereof is connected to the rotational shaft IP1 of the IP joint.

Further, a link member IPL2 (a link mechanism) is provided between the MP joint and the IP joint. The link member IPL2 connects the cylinder main body 321 (MP) of the second driven fluid pressure cylinder 32 (MP) and a support member IPL3 supporting the 6-axis force sensor S1 of the fingertip member.

In the first driven fluid pressure cylinder 32 (CM2), a piston 322 (CM2) slides when a fluid is supplied into the cylinder main body 321 (CM2), and a piston rod 323 (CM2) expands and contracts, causing the CM2 joint to rotate. Thus, the second finger mechanism 12 bends and stretches at the CM2 joint.

In the second driven fluid pressure cylinder 32 (MP), the piston 322 (MP) slides when the fluid is supplied into the cylinder main body 321 (MP), and the piston rod 323 (MP) expands and contracts, causing the MP joint to rotate. At this time, since the MP joint and the IP joint are connected by the connecting members IPL1 and the link member IPL2, the IP joint rotates as the MP joint is rotated by the movement of the second driven fluid pressure cylinder 32 (MP).

The IP joint is constructed so as to be interlocked with the rotation of the MP joint actuated by the second driven fluid pressure cylinder 32 (MP), making it possible to implement movements similar to those of human fingers. In addition, the need for a cylinder or the like for driving the IP joint is obviated, thus permitting a reduced weight of the first finger mechanism 11.

With the arrangement described above, the first finger mechanism 11 bends as the piston rods 323 (CM2) and 323 (MP) of the first driven fluid pressure cylinder 32 (CM2) and the second driven fluid pressure cylinder 32 (MP), respectively, are stretched, while the first finger mechanism 11 stretches as the piston rods 323 (CM2) and 323 (MP) are contracted.

As illustrated in FIG. 3, the CM1 joint of the first finger mechanism 11 is rotated by a third driven fluid pressure cylinder 32 (CM1) having a piston rod 323 (CM1), which expands and contracts in the direction in which the finger mechanisms are arranged. The first finger mechanism 11 stretches the piston rod 323 (CM1) of the third driven fluid pressure cylinder 32 (CM1) to rotate toward the palm side of the palm portion 10, while contracts the piston rod 323 (CM1) of the third driven fluid pressure cylinder 32 (CM1) to rotate toward the second finger mechanism 12.

As illustrated in FIG. 4, the fluid is supplied to the cylinder main body 321 (CM2) of the first driven fluid pressure cylinder 32 (CM2) through a fluid passage 324 (CM2) formed in a bearing 101 of the cylinder main body 321 (CM2) of the first driven fluid pressure cylinder 32 (CM2), which is the rotational shaft of the CM1 joint. With this arrangement, the cylinder main body 321 (CM2) of the first driven fluid pressure cylinder 32 (CM2) can be smoothly rotated, permitting a smooth movement of the first finger mechanism 11 as the CM1 joint rotates.

As illustrated in FIG. 3 and FIG. 4, the CM1 joint, the CM2 joint, and the MP joint are provided with coil springs (torsion springs) CM12, CM22, and MP2, respectively. The coil springs MP2 and CM22 of the MP joint and the CM2 joint, respectively, urge the first finger mechanism 11 in a stretching direction. The coil spring CM12 of the CM1 joint is provided to surround the outer periphery of the cylinder main body 321 (CM2) of the first driven fluid pressure cylinder 32 (CM2), and urges the first finger mechanism 11 to rotate toward the second finger mechanism 12. In other words, the urging directions of the coil springs CM12, CM22, and MP2 are set to be the same directions in which the piston rods 323 (CM1), 323 (CM2), and 323 (MP) of the three driven fluid pressure cylinders (CM1), 32 (CM2), and 32 (MP), respectively, contract.

[Construction of the Second Finger Mechanism]

The second finger mechanism 12 has a first driven fluid pressure cylinder 32 (MP2) which rotates a rotational shaft MP21 of the MP2 joint (a first rotational shaft of the metacarpus finger dactylus joint) and a second driven fluid pressure cylinder 32 (PIP) which rotates the rotational shaft PIP1 of the PIP joint, as illustrated in FIG. 5.

The cylinder main body 321 (MP2) of the first driven fluid pressure cylinder 32 (MP2), which corresponds to a human metacarpal bone, is rotatively supported by the frame 101 of the palm portion 10 (refer to FIG. 1) through the intermediary of the rotational shaft MP11 of the MP1 joint (the first rotational shaft of the metacarpus finger dactylus joint). The cylinder main body 321 (PIP) of the second driven fluid pressure cylinder 32 (PIP), which corresponds to a human proximal phalange, is rotatively connected to the first driven fluid pressure cylinder 32 (MP2) through the intermediary of the rotational shaft MP21 of the MP2 joint.

The pipe 324 (PIP) for supplying a fluid to the cylinder main body 321 (PIP) of the second driven fluid pressure cylinder 32 (PIP) is accommodated in the rotational shaft MP21 of the MP2 joint. This arrangement allows the second finger mechanism 12 to smoothly bend and stretch without being interfered by the pipe 324 (PIP) as the MP2 joint rotates.

Further, the second finger mechanism 12 can be constructed to be compact by disposing the cylinder main body 321 (PIP) of the second driven fluid pressure cylinder 32 (PIP) between the MP2 joint and the PIP joint in the lengthwise direction of the second finger mechanism 12.

The DIP joint is connected to the PIP joint through the intermediary of a connecting member DIPL1 corresponding to a human middle phalanx. A support member DIPL2 supporting the 6-axis force sensor S1 installed consecutively to the fingertip member is rotatively connected to a rotational shaft DIP1 of the DIP joint. One end of the connecting member DIPL1 is rotatively connected to the rotational shaft PIP1 of the PIP joint, while the other end is connected to the rotational shaft DIP1 of the DIP joint.

Further, a link member DIPL3 (link mechanism) is provided between the PIP joint and the DIP joint. The link member DIPL2 connects the cylinder main body 321 (PIP) of the second driven fluid pressure cylinder 32 (PIP) and the support member DIPL2 supporting the 6-axis force sensor S1 of the fingertip member.

In the first driven fluid pressure cylinder 32 (MP2), a piston 322 (MP2) slides when a fluid is supplied into the cylinder main body 321 (MP2), and a piston rod 323 (MP2) expands and contracts, causing the MP2 joint to rotate. Thus, the second finger mechanism 12 bends and stretches at the MP2 joint.

In the second driven fluid pressure cylinder 32 (PIP), the piston 322 (PIP) slides when the fluid is supplied into the cylinder main body 321 (PIP), and the piston rod 323 (PIP) expands and contracts, causing the PIP joint to rotate. At this time, since the PIP joint and the DIP joint are connected by the connecting members DIPL1 and the link member DIPL3, the DIP joint rotates as the PIP joint is rotated by the movement of the second driven fluid pressure cylinder 32 (PIP).

The DIP joint is constructed so as to be interlocked with the rotation of the PIP joint actuated by the second driven fluid pressure cylinder 32 (PIP), making it possible not only to implement movements similar to those of human fingers but also to obviate the need for a cylinder and the like for driving the DIP joint, thus reducing the weight of the second finger mechanism 12.

With the arrangement described above, the second finger mechanism 12 bends as the piston rods 323 (MP2) and 323 (PIP) of the first driven fluid pressure cylinder 32 (MP2) and the second driven fluid pressure cylinder 32 (PIP), respectively, are stretched, while the second finger mechanism 12 stretches as the piston rods 323 (MP2) and 323 (PIP) are contracted.

As illustrated in FIG. 3, the MP1 joint of the second finger mechanism 12 is rotated by a third driven fluid pressure cylinder 32 (MP1) having a piston rod 323 (MP1), which expands and contracts in the direction in which the finger mechanisms are arranged. The third driven fluid pressure cylinder 32 (MP1) stretches the piston rod 323 (MP1) to swing the second finger mechanism 12 toward the third finger mechanism 13, and contracts the piston rod 323 (MP1) to swing the second finger mechanism 12 away from the third finger mechanism 13.

As illustrated in FIG. 5, the MP1 joint, the MP2 joint, and the PIP joint are provided with coil springs (torsion springs) MP12, MP22, and PIP2, respectively. The coil springs PIP2 and MP22 of the PIP joint and the MP2 joint, respectively, urge the second finger mechanism 12 in a stretching direction. The coil spring MP12 of the MP1 joint urges the second finger mechanism 12 to move away from the third finger mechanism 13. In other words, the urging directions of the coil springs MP12, MP22, and PIP2 are set to be the same directions in which the piston rods 323 (MP1), 323 (MP2), and 323 (PIP) of the three driven fluid pressure cylinders 32 (MP1), 32 (MP2), and 32 (PIP), respectively, contract.

The above has described in detail the construction of the second finger mechanism 12, which is the first type of finger mechanism. The construction of the third finger mechanism 13, which is the first type of finger mechanism, is the same as the construction of the second finger mechanism 12.

[Construction of the Second Type of Finger Mechanism]

Each of the fourth finger mechanism 14 and the fifth finger mechanism 15 classified as the second type of finger mechanisms have the same construction as that of, the second finger mechanism 12 described above except that the third driven fluid pressure cylinder 32 (MP1) has been omitted. Since the fourth finger mechanism 14 and the fifth finger mechanism 15 do not have the third driven fluid pressure cylinder 32 (MP1), the MP1 joint freely rotates according to a force operation and spontaneously resets itself to a predetermined position by being urged by the coil spring MP12 of the MP1 joint. In other words, the second type of finger mechanisms has a lower freedom degree of the active movements accordingly, as compared with the first type of finger mechanisms.

[Construction of the Drive Device]

Figure 6:
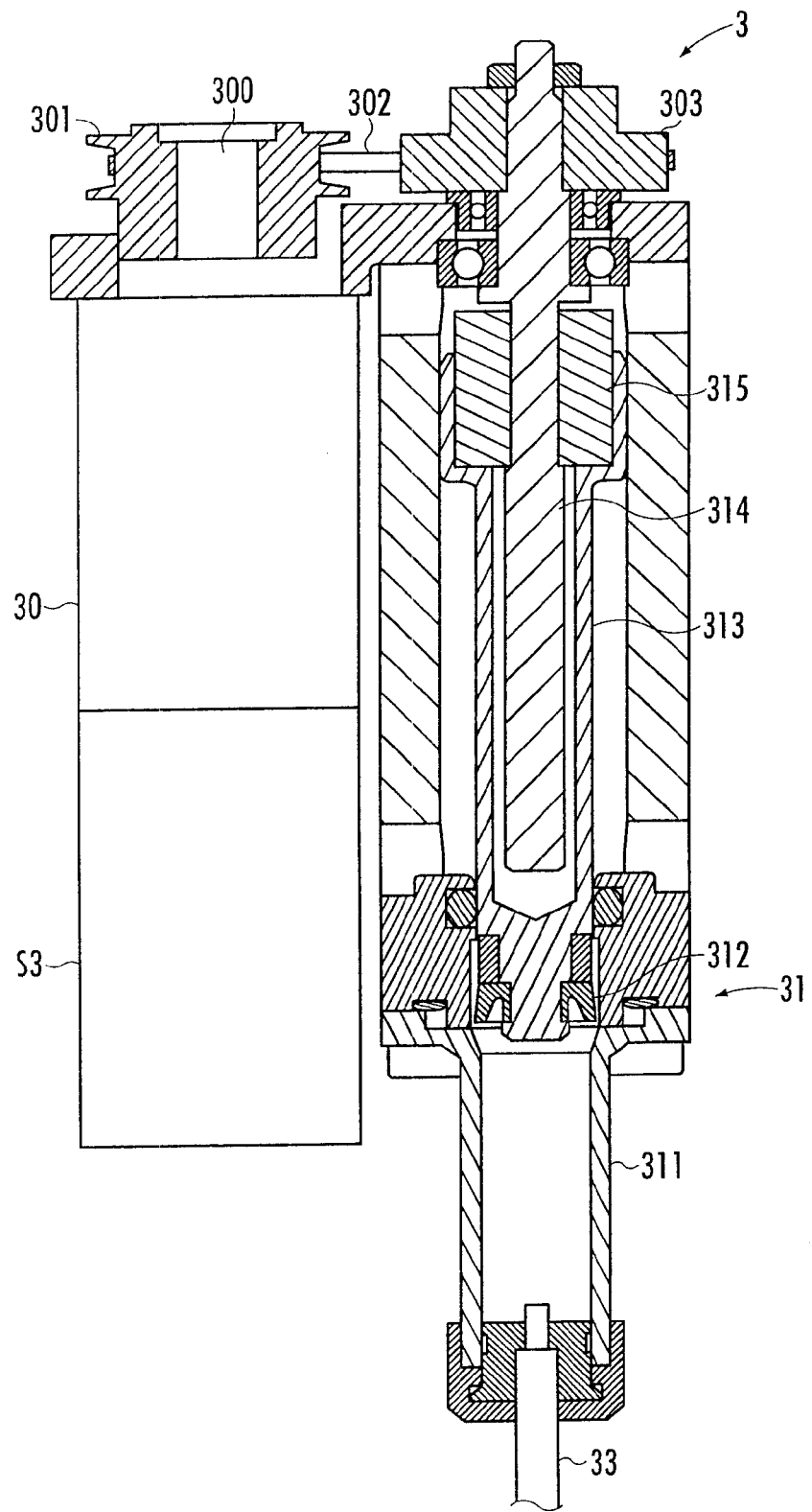
FIG. 6 is a graphical illustration of a part of a drive device of the hand.

The construction of the drive mechanism of the hand 1 will be described. The drive mechanism has, as the constituent elements thereof, a plurality of drive fluid pressure cylinders (master cylinders) 31 illustrated in FIG. 6 and a plurality of driven fluid pressure cylinders (slave cylinders) 32($i$) ($i$=CM1, CM2, MP, MP1, MP2, PIP) (refer to FIGS. 3, 4 and 5). A total of thirteen drive fluid pressure cylinders 31 are provided, corresponding to the individual driven fluid pressure cylinders 32($i$). The drive fluid pressure cylinder 31 and the driven fluid pressure cylinder 32($i$) of the hand 1 are connected through a fluid pressure transmission pipe 33 (piping). The fluid pressure transmission pipe 33 is sufficiently flexible to change the diameter or the cross-sectional area thereof according to a fluid pressure.

The plurality of drive fluid pressure cylinders 31 is disposed as a unit or in a scattered manner at appropriate locations of the robot R (e.g., the internal space of the body B0 or the arm B2).

The drive fluid pressure cylinder 31 includes a cylinder main body 311 accommodating a fluid therein, a piston (master piston) 312 sliding in the cylinder main body 311, and a hollow piston rod 313 provided in a connected row arrangement relative to the piston 312. The drive fluid pressure cylinder 31 further includes a ball screw 314 inserted into the piston rod 313 along the axial line of the piston rod 313, a threaded member 315, which is fixedly installed inside the piston rod 313 and screwed to the ball screw 314, a motor 30 (a rotational drive device), which rotationally drives the ball screw 314 thereby to move the piston rod 313 forward or backward through the intermediary of the threaded member 315, and an encoder S3 for detecting the operational amount of the motor 30. The drive fluid pressure cylinder 31 is provided with a pressure sensor S4 which outputs a signal based on the fluid pressure in the cylinder main body 311.

The motor 30 rotationally drives the ball screw 314 through the intermediary of a belt 302 installed on pulleys 301 and 303 serving as rotation transmitting means. With this arrangement, the axial lines of an output shaft 300 of the motor 30 and the piston rod 313 become parallel and the motor 30 can be located adjacently to the cylinder main body 311, permitting a compact construction.

With the construction described above, as schematically illustrated in FIG. 7, when the master piston 312 is driven forward, a fluid flows out of the drive fluid pressure cylinder 31 into a corresponding driven fluid pressure cylinder 32($i$) through the pipe 33. Then, when the piston (the slave piston) 322($i$) of the driven fluid pressure cylinder 32($i$) moves forward, one of the finger mechanisms 11 to 15 is driven. Conversely, when the master piston 312 is driven backward, the fluid comes in from the drive fluid pressure cylinder 31 and the fluid goes out of a corresponding to driven fluid pressure cylinder 32($i$) through the pipe 33. Then, when the piston 322($i$) of the driven fluid pressure cylinder 32($i$) moves backward, one of the finger mechanisms 11 to 15 is driven.

[Controlling the Movement of the Hand]

The controller 2 is constituted of a computer, which is constructed of a CPU, memories, such as a ROM and a RAM, and circuits, including an A/D circuit and an I/O circuit. In the controller 2, the CPU reads a control program from a memory, as necessary, and the movement of the hand 1 is controlled according to the program that has been read.

The controller 2 controls the operations of each of a plurality of actuators 4 installed in the robot R thereby to control primarily the movement of each joint mechanism of the arm B2 and the movement of each joint of the leg B4. The controller 2 controls the position of the master piston 312 thereby to control the movement or force of each of the finger mechanisms 11 to 15.

Figure 9:
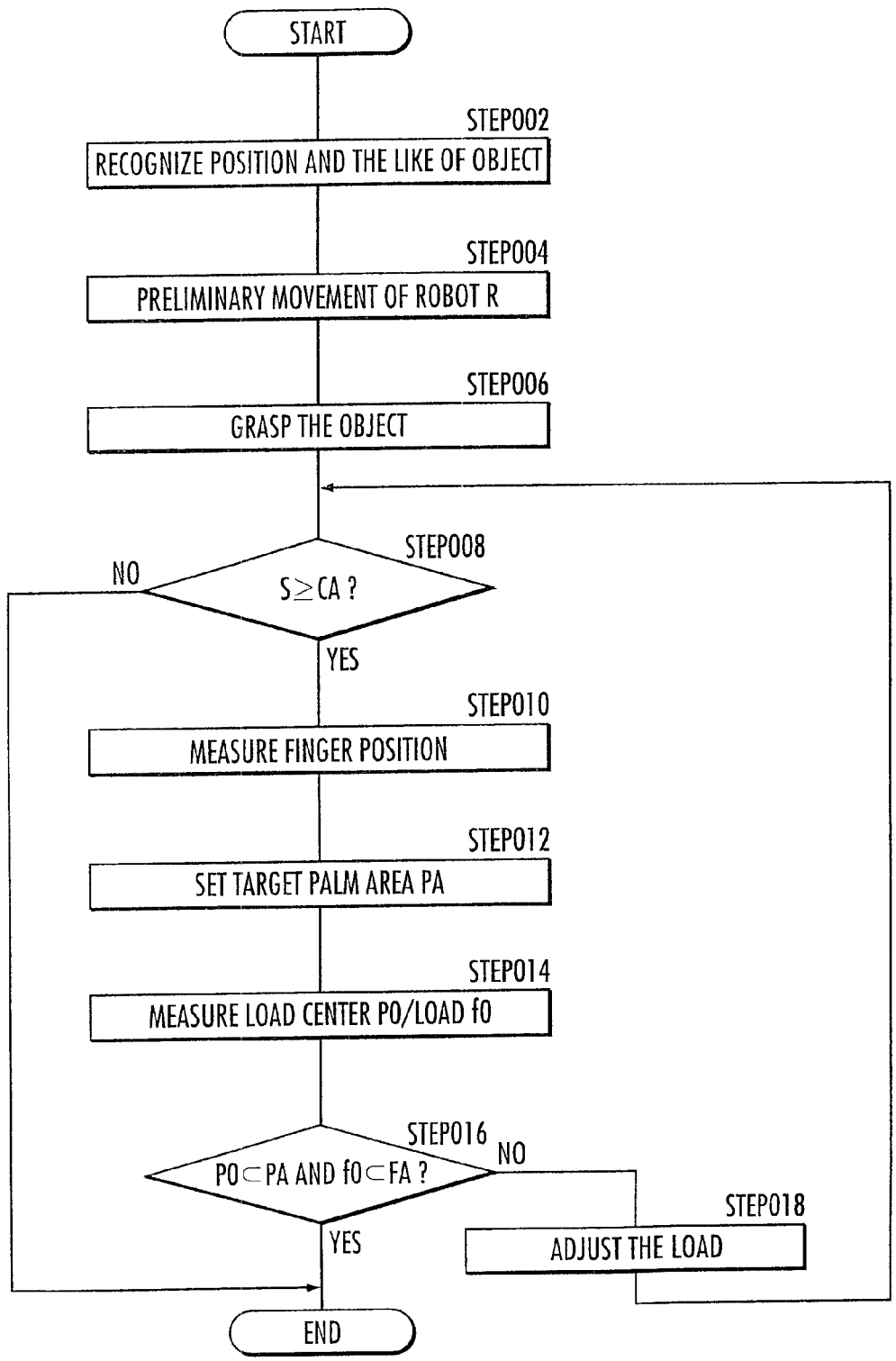
FIG. 9 is a flowchart of a control method of movements of the hand.

As illustrated in FIG. 9, the controller 2 has a first arithmetic processor 21 and a second arithmetic processor 22.

The first arithmetic processor 21 measures the position of contact between the distal end portion of each of the finger mechanisms 11 to 15 and an object, the pressure applied to the object and the direction of the pressure on the basis of the output signals of 6-axis force sensors S1 provided on the distal end portions of each of the finger mechanisms 11 to 15. The first arithmetic processor 21 measures the position of a load center on the palm portion 10 and the load applied to the palm portion 10 on the basis of mainly the output signals of the plurality of pressure sensors S2 disposed at a plurality of locations on the palm side of the palm portion 10. The first arithmetic processor 21 measures the position of the piston 322($i$) of the driven fluid pressure cylinder 32($i$) and the rotational angle of each joint i of each of the finger mechanisms 11 to 15 on the basis of the output signals of the encoder S3 and the fluid pressure sensor S4, respectively.

The second arithmetic processor 22 controls the pressure to be applied to the object from each of the plurality of finger mechanisms 11 to 15 such that the measurement position of the load center in the palm portion 10 will be included in a target palm area PA and the measurement value of the load applied to the palm portion 10 will be included in a target load range in a state wherein the object is in contact with the plurality of finger mechanisms 11 to 15 and the palm portion 10, respectively, by being grasped by the hand 1. Based on the measurement result of the rotational angle of each joint i of each of the finger mechanisms 11 to 15, the second arithmetic processor 22 controls the rotational angle, and consequently controls the position and the posture of each of the finger mechanisms 11 to 15.

The following will describe the functions of the robot R, the hand 1, and the controller 2.

[Basic Control]

The rotational angle at the joint (the angle of the slave joint) θslv of each of the finger mechanisms 11 to 15 is measured according to relational expressions (1) to (6) by the first arithmetic processor 21 on the basis of the output signals of the encoder S3 and the fluid pressure sensor S4.

Figure 7:
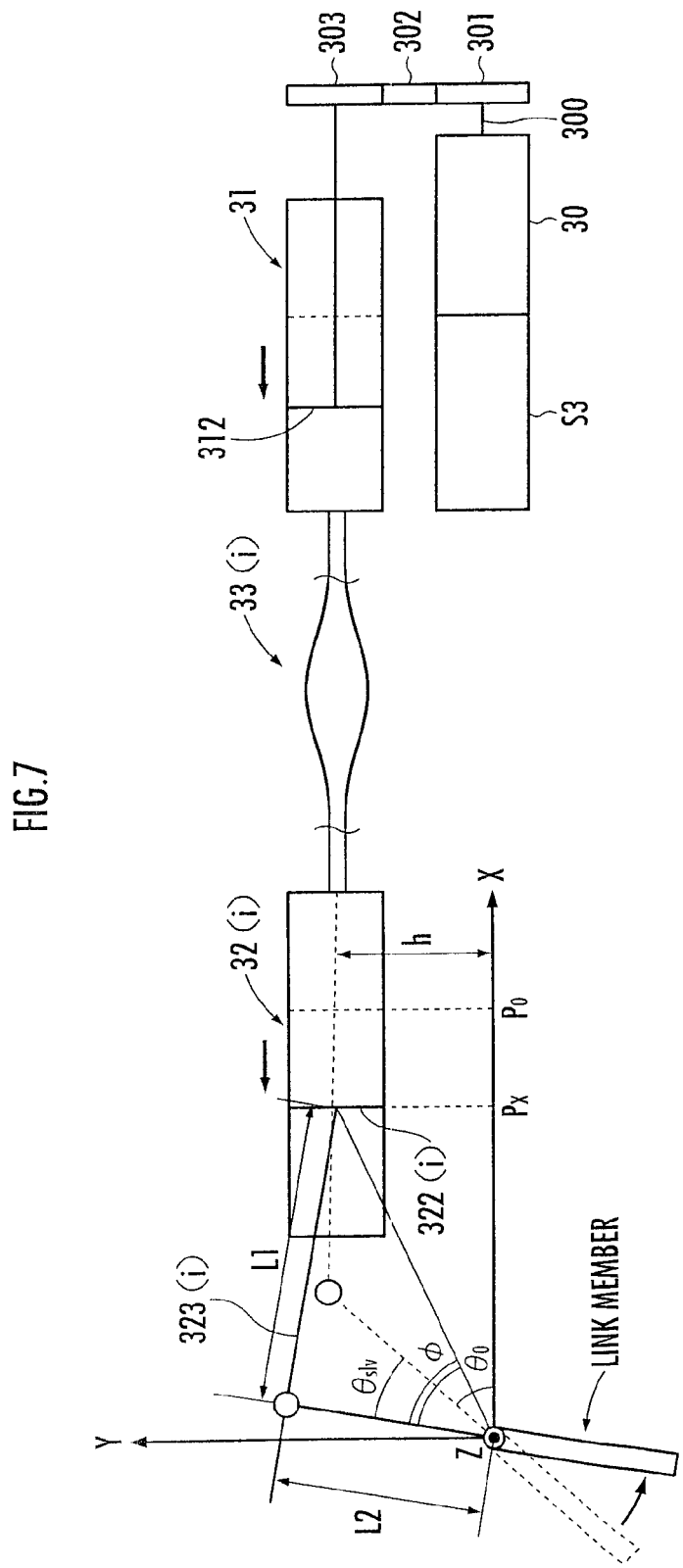
FIG. 7 is a graphical illustration related to a movement of the hand.
Figure 8:
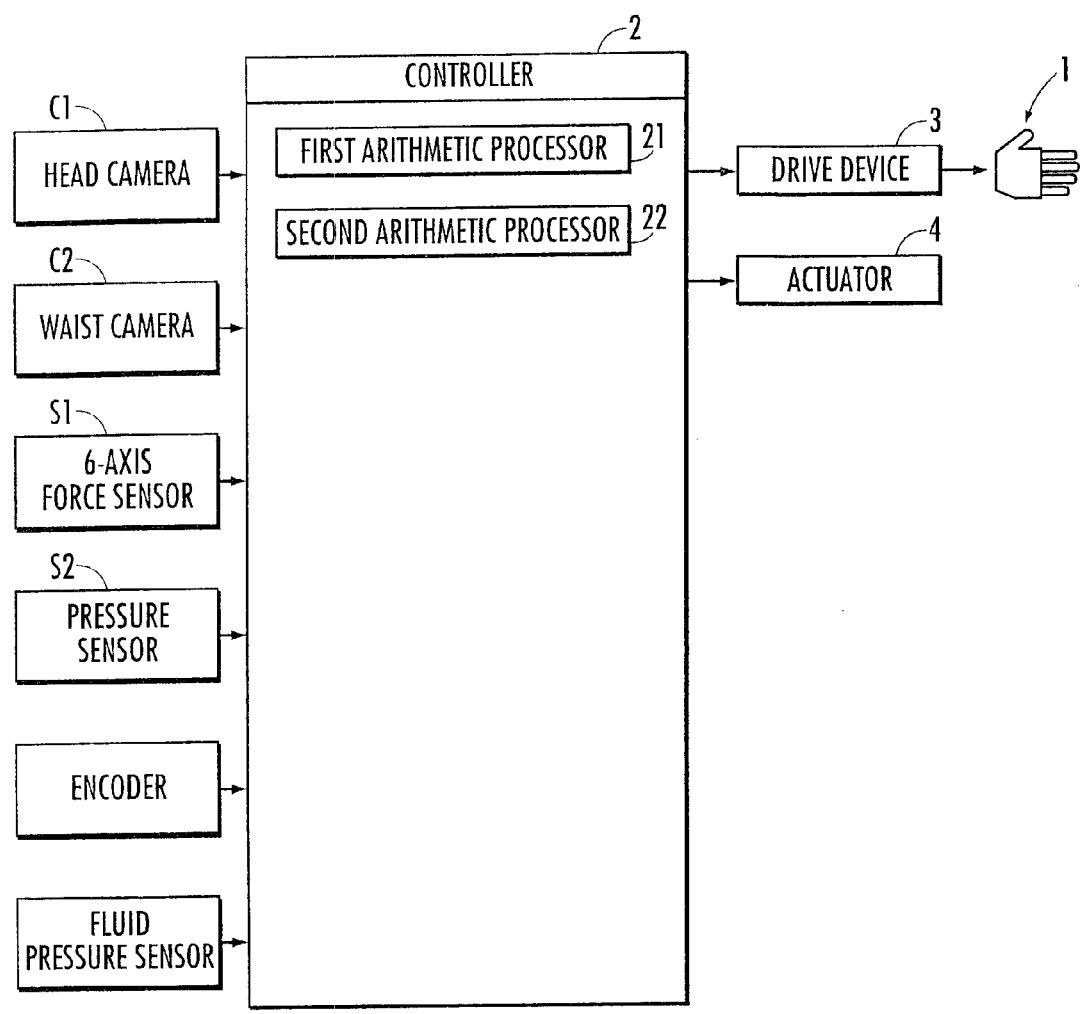
FIG. 8 is a block diagram of a control system of the hand.

For the purpose of the description, an orthogonal coordinate system is considered, in which the direction of the swing axis of the finger link member constituting each of the finger mechanisms 11 to 15 is defined as a Z direction and the direction in which the driven piston 322($i$) is moved forward/backward is defined as an X direction, as illustrated in FIG. 7.

The rotational angle (slave joint angle) θslv is represented by relational expression (1) given below.

$$\theta slv = \phi + \tan^{-1}(h/Px) - \theta 0 \quad (\theta 0 > 0),$$

$$\phi = \cos^{-1}\{(Px^2 + (L2)^2 + h^2 - (L1)^2)/(2L(Px^2 + h^2)^{1/2})\} - \theta 0 \quad (1)$$

where "h" denotes a crank offset, which indicates the distance in a Y direction between the swing axis of the finger link member and the swing axis of the rear end of the rod 323($i$), "L1" denotes the distance between the swing axis of the rear end of the rod 323($i$) and the swing axis of the front end thereof (rod length), and "L2" denotes the distance between the swing axis of the finger link member and the swing axis of the front end of the rod 323($i$) (crank length). The values of the crank offset h, the rod length L1, and the crank length L2 are stored in a memory.

Reference character "Px" denotes the position of the 1D slave piston 322($i$) (slave piston position), and the Px is represented by relational expression (2) given below.

$$Px = P0 - Strkslv \quad (2)$$

where "P0" denotes the reference position of the slave piston 322($i$).

Reference character "Strkslv" denotes a displacement amount from the reference position P0 of the slave piston 322($i$), i.e., a slave stroke represented by relational expression (3) given below.

$$Strkslv = Strkmst \cdot (Smst/Sslv) - StrkOffsetmst + StrkExpslv \quad (3)$$

where "Smst" denotes a cross-sectional area of the master piston 312, "Sslv" denotes the cross-sectional area of the slave piston 322($i$), and "StrkOffsetmst" denotes the offset of the master piston 312 (master stroke offset). The values of the cross-sectional areas Smst and Sslv or the ratio thereof (Smst/Sslv) and the master stroke offset StrkOffsetmst are stored in a memory.

Reference character "Strkmst" denotes the displacement amount of the master piston 312 (master stroke) and can be calculated according to relational expression (4) on the basis of a rotational position MotPosmst of the motor 30 according to an output signal of the encoder S3.

$$Strkmst = MotPosmst \cdot Rr \quad (4)$$

Reference character "Rr" denotes the speed reduction ratio of a speed reducing mechanism (refer to FIG. 6) constructed of the pulleys 301 and 303 and the belt 302, the speed reduction ratio being stored in a memory beforehand.

Reference character "StrkExpslv" denotes the amount of a slave stroke displacement caused by a change in area or the expansion or contraction of the pipe 33 and can be calculated according to relational expression (5) on the basis of the cross-sectional area Sslv of the slave piston 323($i$) and a pipe expansion amount Exppip.

$$SstrkExpslv = Exppip/Sslv \quad (5)$$

where "Exppip" denotes a pipe expansion amount (the amount of a change in volume) and is represented by relational expression (6) on the basis of a target hydraulic value Prscmd, a coefficient Kpip denoting the level of the flexibility of the pipe 33, and a length Lpip of the pipe 33 in addition to a measured fluid pressure Prsact based on an output signal of the fluid pressure sensor S4. The target hydraulic value Prscmd, the coefficient Kpip denoting the level of the flexibility of the pipe 33, and the length Lpip of the pipe 33 are stored in a memory.

$$Exppip = (Prscmd - Prsact) \cdot Kpip \cdot Lpip \quad (6)$$

The movements or the forces of the respective finger mechanisms 11 to 15 are controlled by the second arithmetic processor 22 on the basis of the output signals of the 6-axis force sensors 31 and the pressure sensors S2, as will be described hereinafter, in addition to the slave joint angle θslv measured by the first arithmetic processor 21 as described above.

[Applied Control]

The first arithmetic processor 21 recognizes information necessary for grasping an object, including the position and the posture of the palm portion 10 and the position, posture, shape, size and the like of the object to be held by the hand 1 (STEP002 in FIG. 9).

In order to control the movement of the robot R to grasp the object, a wrist coordinate system, a hand coordinate system, and an object coordinate system are defined in addition to a robot coordinate system. The robot coordinate system is defined to define the position and the posture of the robot R in a world coordinate system. The wrist coordinate system is defined such that, for example, a representative point of the wrist joint mechanism B25 is defined as an origin and the three rotational axes of the wrist joint mechanism B25 are defined as three orthogonal axes. The hand coordinate system is defined such that, for example, one point on the palm surface of the palm portion 10 is defined as an origin, a pair of orthogonal axes parallel to the palm surface is defined as an x-axis and a y-axis, and an axis perpendicular to the palm surface is defined as a z-axis. The object coordinate system is defined such that, for example, a representative point of the object is defined as an origin. The positions and postures of the wrist coordinate system and the hand coordinate system relative to the robot coordinate system can be calculated according to a forward kinematics calculating method on the basis of the factors that change according to the movements of the robot R, such as the bending angles or the like of the shoulder joint mechanism B21, the elbow joint mechanism B23, and the wrist joint mechanism B25 and certain factors indicating the size of the robot R, such as the lengths or the like of the first arm link B22 and the second arm link B24, which are stored in a memory.

The position and the posture of the palm portion 10 are measured on the basis of the output signals from sensors indicating movements of the robot R, such as a rotary encoder or the like for measuring the bending angles of the joint mechanisms of the arm B2. The position and the posture of the palm portion 10 are recognized in terms of coordinate values on the robot coordinate system or Euler angles. The positions and postures of the arm B2 and the leg 84, respectively, of the robot R can be also recognized on the basis of output signals of a movement sensor, such as the rotary encoder.

The position and the posture of the body B0 on a fixed coordinate system (a coordinate system that is fixed independently of the movements of the robot R) are recognized by analyzing images obtained through one or both of the head cameras C1 and the waist camera C2.

Based on the operational amount of the motor 30 indicated by an output signal of the encoder S3, the position and the posture of the distal portion of each of the finger mechanisms 11 to 15 are recognized. The position of the distal portion of each finger mechanism is defined as the position and the posture on the hand coordinate system calculated according to the forward kinetics calculating method on the basis of the bending angle of each joint mechanism based on an output signal of the encoder S3, the invariable position of the proximal portion of each finger mechanism on the hand coordinate system and the length or the like of the finger dactylus link of each finger mechanism.

The position, posture, shape, and size of the object are recognized on the basis of images in the neighborhood of the robot R captured by one or both of the head cameras C1 and the waist camera C2. The position and the posture of the object are recognized by coordinate values in the robot coordinate system and Euler angles. The position and the posture of the object on the robot coordinate system change as the position and the posture of the robot R (e.g., the position of the body B0 and the posture of a basic front forehead surface) change, so that the position and the posture of the object are sequentially recognized or measured. Alternatively, a part or all of information to be recognized may be input to the controller 2 from a terminal device located outside the robot R and then the input information may be recognized by the first arithmetic processor 21.

Further, the operations of the actuators 4 are controlled by the second arithmetic processor 22 on the basis of primarily the position of the object recognized by the first arithmetic processor 21, thereby controlling the preliminary movement of the robot R to hold the object by the hand 1 (STEP004 in FIG. 9). More specifically, the legs B4 are moved, as necessary, to adjust the position and the posture of the robot R. Then, the arms B2 are moved to adjust the palm portions 10 to a position and a posture appropriate for grasping the object.

Further, based mainly on the position and the posture of the object recognized by the first arithmetic processor 21, the second arithmetic processor 22 controls the movements of the arms B2 as necessary according to the movements of the finger mechanisms 11 to 15, thereby grasping the object by the hand 1 (STEP006 in FIG. 9).

Figure 10:
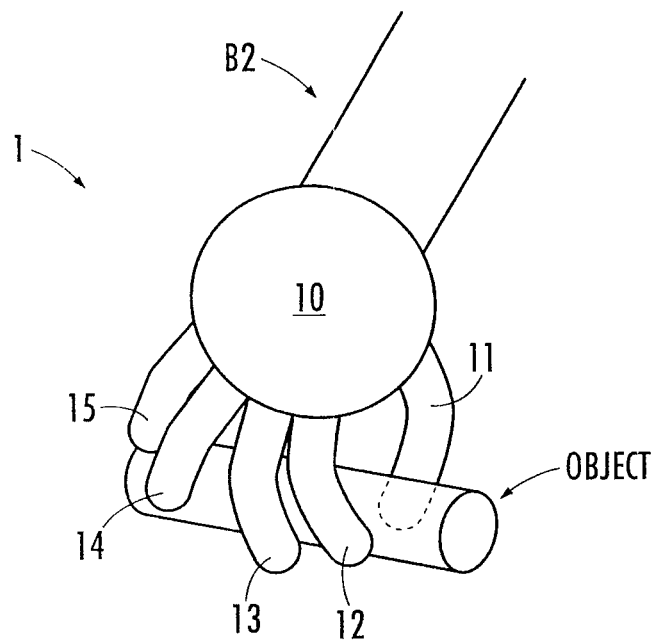
FIG. 10($a$) and FIG. 10($b$) are graphical illustrations of the movements of the hand for grasping an object.
Figure 10:
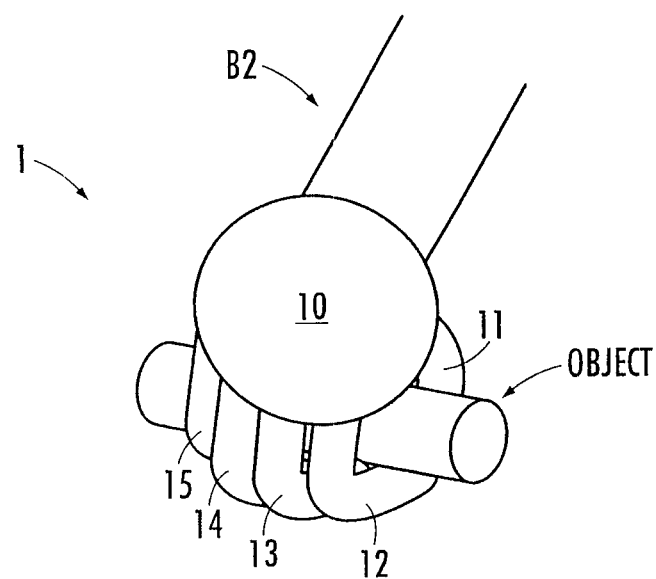

For example, with the position and the posture of the palm portion 10 maintained as illustrated in FIG. 10($a$), the object is wrapped by the first type of finger mechanisms 11 to 13 among the finger mechanisms of the hand 1. Further, the object is pressed against the palm portion 10 by the second type of finger mechanisms 14 and 15 in addition to the first type of finger mechanisms 11 to 13. As a result, the object is grasped by the hand 1 in the state wherein the object is in contact with at least some of the finger mechanisms 11 to 15 and the palm portion 10, respectively, as illustrated in FIG. 10($b$).

The first arithmetic processor 21 determines whether a palm contact area S is a reference value CA or more on the basis of the output signals of the plurality of pressure sensors S2 disposed on the palm portion 10 (STEP008 in FIG. 9). The palm contact area S is calculated on the basis of the number of the plurality of pressure sensors S2, which output signals (pressure signals) based on a significant pressure (of, for example, a predetermined minute value or more) and are adjacent to each other, constituting a group or a cluster, or the number and the arrangement thereof.

Figure 11:
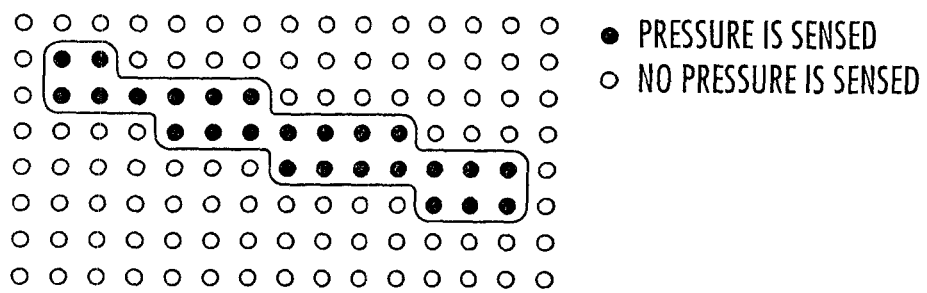
FIG. 11($a$) and FIG. 11($b$) are graphical illustrations of a method for calculating a palm contact area.
Figure 11:
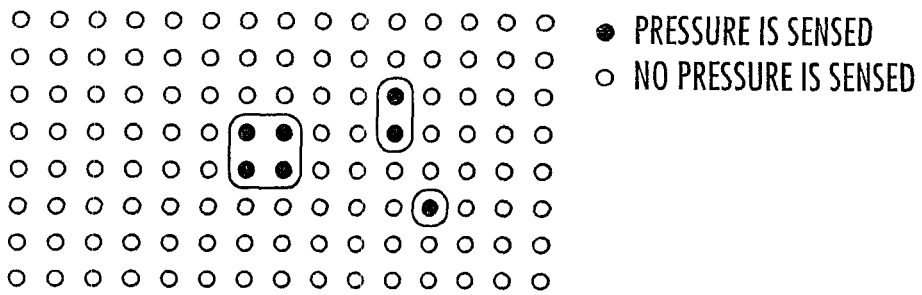

Here, a situation is considered in which the plurality of pressure sensors S2 is arranged as illustrated in FIG. 11. Referring to FIG. 11, the pressure sensors S2 issuing pressure signals are denoted by black dots "•" and the pressure sensors S2 not issuing pressure signals are denoted by white dots "o". As illustrated in FIG. 11($a$), there are twenty-five pressure sensors S2 which output pressure signals and are adjacent to each other, constituting a group. This numeric value, twenty-five, or a numeric value proportional to twenty-five is calculated as the palm contact area S. Referring to FIG. 11($b$), the number of the pressure sensors S2 issuing pressure signals is seven, while the number of the pressure sensors S2 constituting a largest group in which the pressure sensors S2 are adjacent to each other is four. This numeric value, four, or a numeric value proportional to four is calculated as the palm contact area S. If the reference value CA is, for example, fifteen, then the palm contact area S is determined to be the reference value CA or more in the state illustrated in FIG. 11($a$), while the palm contact area S is determined to be below the reference value CA in the state illustrated in FIG. 11($b$).

If the palm contact area S is determined to be below the reference value CA (NO in STEP008 of FIG. 9), then a series of processing steps is terminated.

If the palm contact area S is determined to be the reference value CA or more (YES in STEP008 of FIG. 9), then the first arithmetic processor 21 measures finger positions P1 to P5 of the finger mechanisms 11 to 15, respectively, on the basis of the output signals of the 6-axis force sensors S1 provided on the distal end portions of the finger mechanisms (STEP010 in FIG. 9). A finger position Pi of an i-th finger mechanism (i=1 to 5) is referred to as "the i-th finger position."

To be specific, first, the location at which the i-th finger mechanism and the object are in contact is calculated on the basis of an output signal of the 6-axis force sensor S1. The position and the posture of the distal end portion of the i-th finger mechanism on a reference coordinate system of the robot coordinate system or the like can be calculated according to a forward kinematics model on the basis of an output signal of the encoder S3 corresponding to the i-th finger mechanism. Then, a friction cone having the aforesaid contact location as the apex thereof and having an axis, the posture of which depends upon the contact location, is defined.

Figure 12:
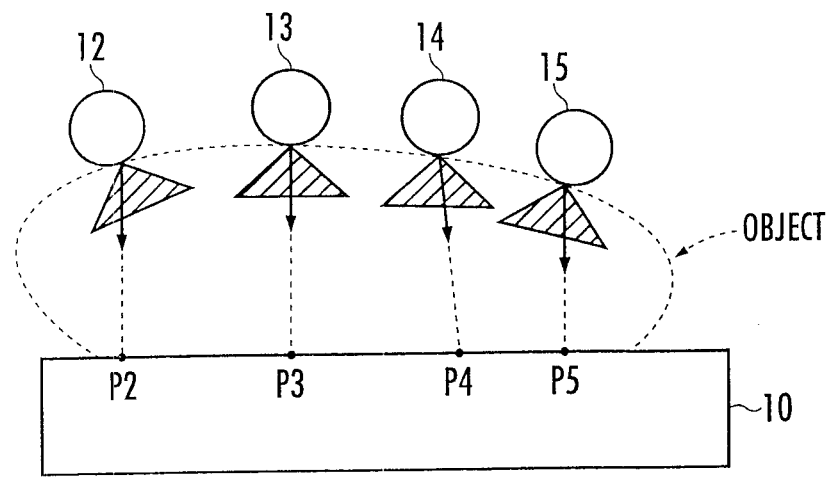
FIG. 12($a$) and FIG. 12($b$) are graphical illustrations of a method for measuring finger positions.
Figure 12:
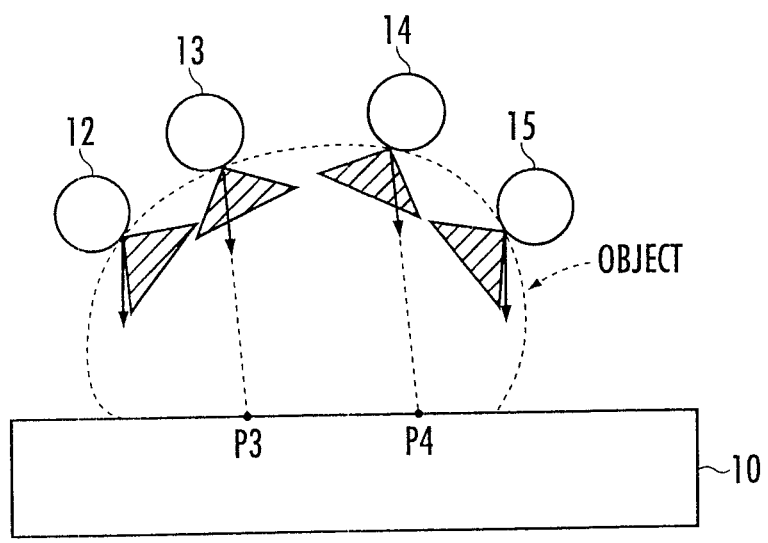
Figure 13:
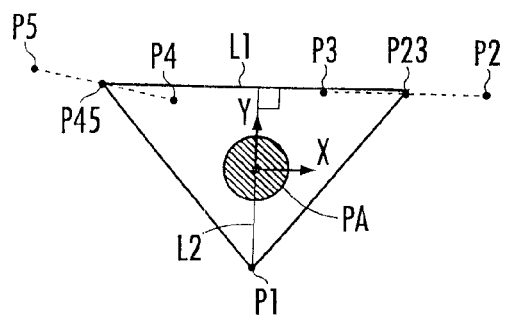
FIG. 13($a$) through FIG. 13($e$) are graphical illustrations of a method for adjusting a load in a state wherein the first finger mechanism is in contact with an object in an appropriate manner.
Figure 13:
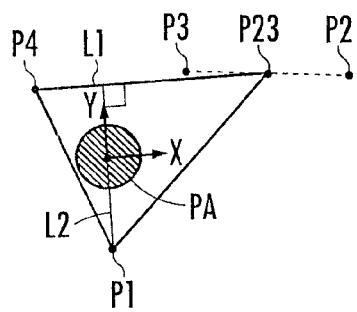
Figure 13:
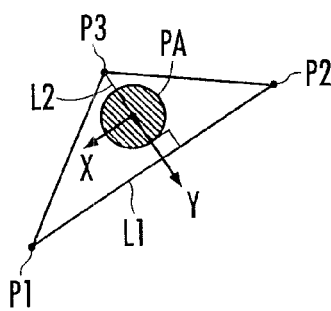
Figure 13:
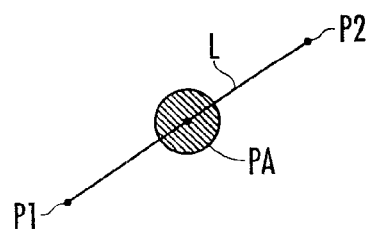
Figure 13:
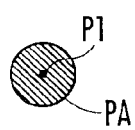
Figure 14:
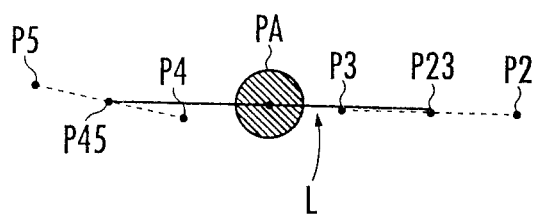
FIG. 14($a$) through FIG. 14($d$) are graphical illustrations of a method for adjusting a load in a state wherein the first finger mechanism is in contact with an object in an inappropriate manner.
Figure 14:
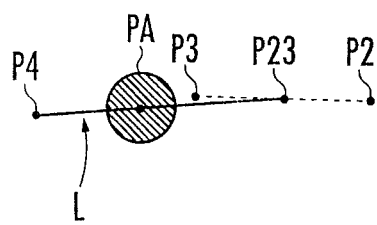
Figure 14:
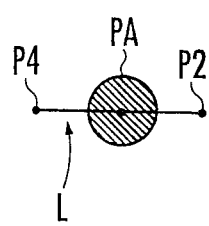
Figure 14:
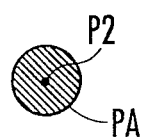

Thus, the friction cones indicated by the hatched triangles in FIGS. 12(a) and 12(b) are defined. In FIG. 12, the first finger mechanism 11 has been omitted in order to simplify the illustration. This, however, does not mean that the first finger mechanism 11 is not in contact with the object.

Further, provided that, when the i-th finger mechanism is moved to be in contact with the object from the position at which the distal end portion of the i-th finger mechanism is in contact with the object, a force vector extending in the direction in which the distal end portion is displaced passes the friction cone, the intersection point of the force vector and the surface of the palm side of the palm portion 10 is calculated as the i-th finger position. The displacement direction of the distal end portion of the i-th finger mechanism in the reference coordinate system of the robot coordinate system or the like can be calculated according to the forward kinetics model on the basis of an output signal of the encoder S3 corresponding to the i-th finger mechanism and an output signal of a sensor based on the bending angle of the wrist joint mechanism or the like.

FIG. 12(a) illustrates a situation wherein the force vectors (refer to the arrows) of all finger mechanisms 12 to 15 pass the friction cones. In this situation, all the finger positions P2 to P5 can be calculated.

FIG. 12(b) illustrates a situation wherein the force vectors (refer to the arrows) of the third finger mechanism 13 and the fourth finger mechanism 14 among the finger mechanisms 12 to 15 pass the friction cones, whereas the force vectors of the second finger mechanism 12 and the fifth finger mechanism 15 deviate from the friction cones. In this situation, the third finger position P3 and the fourth finger position P4 are calculated, while the second finger position P2 and the fifth finger position P5 are not calculated.

Subsequently, based on the finger positions calculated as described above, a second target palm area PA is set (STEP012 in FIG. 9).

FIGS. 13(a) to (e) illustrate cases where at least the first finger position P1 has been measured.

FIG. 13(a) illustrates a case where the first finger position P1 and the remaining four finger positions P2 to P5 have been measured. In this case, a triangle having the first finger position P1, an intermediate position P23 of a Line segment connecting the second finger position P2 and the third finger position P3, and an intermediate position P45 of a line segment connecting the fourth finger position P4 and the fifth finger position P5 as the apexes thereof is defined. Then, a circular area, the center of which is the intermediate position of a perpendicular (a second reference line segment) L2 extending from an apex opposing a long side (a first reference line segment) L1 of the triangle to the long side L1, and which fits within the triangle is set as the target palm area PA.

FIG. 13(b) illustrates a case where the first finger position P1 and other three finger positions P2 to P4 have been measured. In this case, a triangle having the first finger position P1, an intermediate position P23 of the line segment connecting the second finger position P2 and the third finger position P3, and the fourth finger position P4 as the apexes thereof is defined. Then, a circular area, the center of which is the intermediate position of a perpendicular (the second reference line segment) L2 extending from the apex opposing the long side (a first reference line segment) L1 of the triangle to the long side L1, and which fits within the triangle is set as the target palm area PA. If the three finger positions include the fourth finger position P4 and the fifth finger position P5, then a triangle having the intermediate position P45 of a line segment connecting the two finger positions as one of the apexes thereof is defined.

FIG. 13(c) illustrates a case where the first finger position P1 and other two finger positions P2 and P3 have been measured. In this case, a triangle having the first finger position P1, the second finger position P2, and the third finger position P3 as the apexes thereof is defined. Then, a circular area, the center of which is the intermediate position of the perpendicular (the second reference line segment) L2 extending from the apex opposing the long side (the first reference line segment) L1 of the triangle to the long side L1, and which fits within the triangle is set as the target palm area PA. If the first finger position P1 and other arbitrary two finger positions are measured, then the target palm area PA is set in the same manner.

FIG. 13(d) illustrates a case where the first finger position P1 and another finger position P2 have been measured. In this case, a circular area, the center of which is the intermediate position of a reference line segment L connecting the first finger position P1 and the second finger position P2, is set as the target palm area PA. If the first finger position P1 and another arbitrary finger position are measured, then the target palm area PA is set in the same manner.

FIG. 13(e) illustrates a case wherein only the first finger position P1 has been measured. In this case, a circular area centering about the first finger position P1 is set as the target palm area PA.

In any case where the triangle is defined as described above, an area which has one of the five centers of the triangle as the reference thereof and which fits within the triangle may be set as the target palm area PA. The target palm area PA is not limited to the circular shape and may be in various other shapes, including oval, square, rectangular, rhombic, and pentagonal shapes.

FIGS. 14(a) to (d) illustrate cases where the first finger position P1 has not been measured.

FIG. 14(a) illustrates a case where the four finger positions P2 to P5 other than the first finger position P1 have been measured. In this case, a circular area, the center of which is the intermediate position of the reference line segment L connecting the intermediate position P23 of the line segment connecting the second finger position P2 and the third finger position P3 and the intermediate position P45 of the line segment connecting the fourth finger position P4 and the fifth finger position P5, is set as the target palm area PA. If the three finger positions include the second finger position P2 and the third finger position P3, then a triangle having an intermediate position P23 of the line segment connecting the second finger position P2 and the third finger position P3, the fourth finger position P4, and the fifth finger position P5 as the apexes thereof or a triangle having an intermediate position P45 of a line segment connecting the fourth finger position P4 and the fifth finger position P5, the second finger position P2, and the third finger position P3 as the apexes thereof can be defined.

FIG. 14(b) illustrates a case where three finger positions P2 to P4 other than the first finger position P1 have been measured. In this case, a circular area, the center of which is the intermediate position of the reference line segment L connecting the intermediate position P23 of the line segment connecting the second finger position P2 and the third finger position P3 and the fourth finger position P4, is set as the target palm area PA. If the three finger positions include the fourth finger position P4 and the fifth finger position P5, then a triangle having the intermediate position P45 of the line segment connecting the two finger positions as one of the apexes thereof is defined.

FIG. 14(c) illustrates a case where two finger positions P2 and P3 other than the first finger position have been measured. In this case, a circular area which has, as the center thereof, the intermediate position of the reference line segment L connecting the second finger position P2 and the third finger position P3 is set as the target palm area PA. In the case where an arbitrary finger position other than the first finger position P1 has been measured, the target palm area PA is set in the same manner.

FIG. 14(d) illustrates a case where only one finger position P2 other than the first finger position P1 has been measured. In this case, a circular area centering around the second finger position P2 is set as the target palm area PA. In the case where only one of the third finger position P3, the fourth finger position P4, and the fifth finger position P5 has been measured in place of the second finger position P2, the target palm area PA is set also in the same manner.

Further, the first arithmetic processor 21 measures a load center p0 in the palm portion 10 and a load f0 applied to the palm portion 10 on the basis of the output signals of the plurality of pressure sensors S2 disposed on the palm portion 10 (STEP014 in FIG. 9). The calculation method has been disclosed in detail in Japanese Patent Application Laid-Open No. 2007-196372, so that the calculation method will not be described herein.

Subsequently, the second arithmetic processor 22 determines whether a first condition that the load center p0 in the palm portion 10 is included in the target palm area PA and a second condition that the load f0 applied to the palm portion 10 is included in a target load range FA, respectively, are satisfied (STEP016 in FIG. 9).

The target load range FA is stored in a memory. The target load range FA may be constant or may be variably set according to the attributes of an object. For example, images obtained through the head cameras C1 or the waist camera C2 are analyzed so as to recognize the appearance characteristics, such as the shape and the color, of the object and the attributes can be searched for from a database on the basis of the appearance characteristics.

If it is determined that at least one of the first condition and the second condition is not satisfied (NO in STEP016 of FIG. 9), then the pressure applied to the object from the i-th finger mechanism, the i-th finger position Pi of which has been measured, is controlled by the second arithmetic processor 22 (STEP018 in FIG. 9). To simplify the description, the pressure applied from the i-th finger mechanism to the object will be referred to as the i-th finger pressure. The finger pressure is increased by carrying out "finger pressure increasing control," while the finger pressure is decreased by carrying out "finger pressure decreasing control."

In the case illustrated in FIG. 13(a), the i-th finger pressure is controlled as described below to displace the load center. To displace the load center toward the second finger position P2 and the third finger position P3 in the direction parallel to the first reference line segment L1, that is, the x-direction, the resultant force of the second finger pressure and the third finger pressure is increased, and instead thereof or in addition thereto, the resultant force of the fourth finger pressure and the fifth finger pressure is decreased. Conversely, to displace the load center toward the fourth finger position P4 and the fifth finger position P5 in the x-direction, the resultant force of the second finger pressure and the third finger pressure is decreased, and instead thereof or in addition thereto, the resultant force of the fourth finger pressure and the fifth finger pressure is increased. Further, to displace the load center toward the first finger position P1 in the direction parallel to the second reference line segment L2, that is, the y-direction, the first finger pressure is increased, and instead thereof or in addition thereto, the resultant force of the second to the fifth finger pressures is decreased. Conversely, to displace the load center toward the finger positions P2 to P5 in the y-direction, the first finger pressure is decreased, and instead thereof or in addition thereto, the resultant force of the second to the fifth finger pressures is increased.

In the case illustrated in FIG. 13(b), the i-th finger pressure is controlled as described below to displace the load center. To displace the load center toward the second finger position P2 and the third finger position P3 in the direction parallel to the first reference line segment L1, that is, the x-direction, the resultant force of the second finger pressure and the third finger pressure is increased, and instead thereof or in addition thereto, the fourth finger pressure is decreased. Conversely, to displace the load center toward the fourth finger position P4 in the x-direction, the resultant force of the second finger pressure and the third finger pressure is decreased, and instead thereof or in addition thereto, the fourth finger pressure is increased. Further, to displace the load center toward the first finger position P1 in the direction parallel to the second reference line segment L2, that is, the y-direction, the first finger pressure is increased, and instead thereof or in addition thereto, the resultant force of the second to the fourth finger pressures is decreased. Conversely, to displace the load center toward the finger positions P2 to P4 in the y-direction, the first finger pressure is decreased, and instead thereof or in addition thereto, the resultant force of the second to the fourth finger pressures is increased.

In the case illustrated in FIG. 13(c), the i-th finger pressure is controlled as described below to displace the load center. To displace the load center toward the first finger position P1 in the direction parallel to the first reference line segment L1, that is, the x-direction, the first finger pressure is increased, and instead thereof or in addition thereto, the second finger pressure is decreased. Conversely, to displace the load center toward the second finger position P2 in the x-direction, the first finger pressure is decreased, and instead thereof or in addition thereto, the second finger pressure is increased. Further, to displace the load center toward the first finger position P1 and the second finger position P2 in the direction parallel to the second reference line segment L2, that is, the y-direction, the resultant force of the first finger pressure and the second finger pressure is increased, and instead thereof or in addition thereto, the third finger pressures is decreased. Conversely, to displace the load center toward the third finger position P3 in the y-direction, the resultant force of the first finger pressure and the second finger pressure is decreased, and instead thereof or in addition thereto, the third finger pressures is increased.

In the case illustrated in FIG. 13(d), the i-th finger pressure is controlled as described below to displace the load center. To displace the load center toward the first finger position P1 in the direction parallel to the reference line segment L, the first finger pressure is increased, and instead thereof or in addition thereto, the second finger pressure is decreased. Conversely, to displace the load center toward the second finger position P2 in the direction, the first finger pressure is decreased, and instead thereof or in addition thereto, the second finger pressure is increased.

In the case illustrated in FIG. 14(a), the i-th finger pressure is controlled as described below to displace the load center. To displace the load center toward the second finger position P2 and the third finger position P3 in the direction parallel to the reference line segment L, the resultant force of the second finger pressure and the third finger pressure is increased, and instead thereof or in addition thereto, the resultant force of the fourth finger pressure and the fifth finger pressure is decreased. Conversely, to displace the load center toward the fourth finger position P4 and the fifth finger position P5 in the direction, the resultant force of the second finger pressure and the third finger pressure is decreased, and instead thereof or in addition thereto, the resultant force of the fourth finger pressure and the fifth finger pressure is increased.

In the case illustrated in FIG. 14(b), the i-th finger pressure is controlled as described below to displace the load center. To displace the load center toward the second finger position P2 and the third finger position P3 in the direction parallel to the reference line segment L, the resultant force of the second finger pressure and the third finger pressure is increased, and instead thereof or in addition thereto, the fourth finger pressure is decreased. Conversely, to displace the load center toward the fourth finger position P4 in the direction, the resultant force of the second finger pressure and the third finger pressure is decreased, and instead thereof or in addition thereto, the fourth finger pressure is increased.

In the case illustrated in FIG. 14(c), the i-th finger pressure is controlled as described below to displace the load center. To displace the load center toward the second finger position P2 in the direction parallel to the reference line segment L, the second finger pressure is increased, and instead thereof or in addition thereto, the fourth finger pressure is decreased. Conversely, to displace the load center toward the fourth finger position P4 in the direction, the second finger pressure is decreased, and instead thereof or in addition thereto, the fourth finger pressure is increased.

Alternatively, the operation of a corresponding motor 30 may be controlled by the second arithmetic processor 22 such that the i-th finger mechanism is detached once from the object and then brought back into contact with the object again. This makes it possible to displace the load center p0 in the palm portion 10 toward the target palm area PA by slightly changing the way the hand 1 holds the object.

Further, during or after the adjustment of the position of the load center, the resultant force of the i-th finger pressures of all i-th finger mechanisms, the i-th finger positions Pi of which have been defined, is adjusted, thereby adjusting the load applied to the palm portion 10.

After the load and the position of the load center are adjusted as described above, the processing from the determination of whether the palm portion contact area is the reference value CA or more is repeated (refer to STEP008 of FIG. 9).

Subsequently, if the second arithmetic processor 22 determines that the first condition and the second condition are satisfied, that is, if it is determined that the load center p0 in the palm portion 10 is included in the target palm area PA and the load f0 is included in the target load range FA (YES in STEP016 of FIG. 9), then the series of processing steps described above is terminated.

According to the hand 1 exhibiting the functions described above, the pipe 33 is flexible enough to allow the cross-sectional area thereof to change according to the pressure of a fluid, thus permitting a higher freedom degree of the disposition of the pipe 33 and the master cylinder 31 connected via the pipe 33. Furthermore, a change in the cross-sectional area of the pipe 33 caused by a changing pressure of the fluid in the pipe 33 is taken into account, so that the slave piston position Px can be measured with high accuracy (refer to FIG. 7 and relational expressions (1) to (6)). Therefore, the movements of the finger mechanisms 11 to 15 can be stably controlled on the basis of the measured position Px of the slave piston 323(i) (refer to FIGS. 9 to 14).

Moreover, in a state wherein the object is in contact with the plurality of finger mechanisms 11 to 15 and the palm portion 10, respectively, by being grasped by the hand 1, the load applied to the object from the plurality of finger mechanisms 11 to 15 can be adjusted (refer to STEP014 of FIG. 9, and FIG. 11 to FIG. 14). Thus, if the position of the load center p0 in the palm portion 10 in the aforesaid state deviates from the target palm area PA, that is, if the position of the load center p0 is inappropriate to ensure stable grasp of the object, typically represented by excessively unbalanced distribution of the load on the palm portion 10, then the position of the load center p0 can be displaced to be included in the target palm area PA. Further, if the load f0 applied to the palm portion 10 in the aforesaid state deviates from the target load range FA, that is, if the load f0 is inappropriate to ensure stable grasp of the object, typically represented by an excessively low load applied to the palm portion 10, then the load f0 can be adjusted so as to fall within the target load range FA.

A minimum required number of the first type of finger mechanisms for pinching an object is two, and the minimum number of the second type of finger mechanisms for grasping the object is one. Hence, the number of the finger mechanisms may be changed to any number, such as three, four or six, as long as the number is three or more.

According to the embodiment described above, the degree of freedom of active movements has been differentiated between the first type and the second type of finger mechanisms by differentiating the freedom degree of active rotational movements of the MP1 joint (or the CM1 joint). Further, the freedom degree of the active movements may be differentiated between the first type and the second type of finger mechanisms by differentiating the freedom degree of the active rotational movements in any combination of the MP1 joint (or the CM1 joint), the MP2 joint (or the CM2 joint), the PIP joint (or the MP joint), and the DIP joint (or the IP joint) (refer to FIG. 2).

What is claimed is:

1. A control system of a robot hand which is provided with a palm portion and a plurality of finger mechanisms extended from the palm portion and which is capable of grasping an object by moving the plurality of finger mechanisms, the control system comprising:

a first arithmetic processor configured to measure a position of a load center in the palm portion, a load applied to the palm portion, and as a finger position, a position at which each of the plurality of finger mechanisms is in contact with the object and which is projected onto the palm portion in a direction of a finger pressure; and a second arithmetic processor configured to control a finger pressure, which is a load applied to the object from each of the plurality of finger mechanisms, such that a measurement position of the load center in the palm portion is included in a target palm area and a measurement value of the load applied to the palm portion is included in a target load range in a state wherein the object is in contact with the plurality of finger mechanisms and the palm portion, respectively, by being grasped by the hand, wherein in a case where the first arithmetic processor measures three or more finger positions, the second arithmetic processor is configured to set the target palm area such that the target palm area falls within a triangle having a finger position or an intermediate position of a pair of finger positions as an apex thereof, to adjust a relative magnitude of the finger pressure of a single finger mechanism or the resultant force of a pair of finger mechanisms corresponding to one end of a long side of the triangle and the finger pressure of a single finger mechanism or the resultant force of a pair of finger mechanisms corresponding to the other end of the long side of the triangle thereby to displace the load center in the palm portion in a direction parallel to the long side, and to adjust the relative magnitude of the finger pressure of a single finger mechanism or the resultant force of a pair of finger mechanisms corresponding to the apex of the triangle opposing the long side and the resultant force of the finger pressures of the plurality of finger mechanisms corresponding to both ends of the long side, thereby changing the load center in the palm portion in a direction perpendicular to the long side.

2. The control system according to claim 1, wherein in a case the first arithmetic processor measures two finger positions, the second arithmetic processor is configured to set an area, which expands using an intermediate position of a reference line segment connecting the two finger positions as a reference point thereof, as the target palm area and to displace the load center in the palm portion in a direction parallel to the reference line segment by adjusting the relative magnitude of the finger pressure of a single finger mechanism corresponding to one end of the reference line segment and the finger pressure of another finger mechanism corresponding to the other end of the reference line segment.

3. The control system according to claim 1, wherein the first arithmetic processor is configured to define a frictional circular cone having a position, at which a finger mechanism and an object are in contact, as the apex thereof and to measure the finger position of the finger mechanism, provided that a finger pressure vector applied to the object from the finger mechanism passes the frictional circular cone.

4. The control system according to claim 1, wherein the first arithmetic processor is configured to measure an area of a whole region in which the palm portion and the object are in contact as a palm contact area and to measure the finger position, provided that the palm contact area is a reference value or more.

5. A robot hand comprising:
a palm portion;
a plurality of finger mechanisms extended from the palm portion; and
the control system according to claim 1.

6. A control program of a robot hand for causing a computer to function as the control system according to claim 1, the control program stored on a non-transitory computer readable medium.

7. A control method of a robot hand which has a palm portion and a plurality of finger mechanisms extended from the palm portion and which is capable of grasping an object by moving the plurality of finger mechanisms, comprising:
a step for measuring a position of a load center in the palm portion, a load applied to the palm portion, and, as a finger position, a position at which each of the plurality of finger mechanisms is in contact with the object and which is protected onto the palm portion in a direction of a finger pressure, using a first arithmetic processor; and
a step for controlling a finger pressure, which is a load applied to the object from each of the plurality of finger mechanisms, such that a measurement position of the load center in the palm portion is included in a target palm area and a measured value of the load applied to the palm portion is included in a target load range in a state wherein the object is in contact with the plurality of finger mechanisms and the palm portion, respectively, by being grasped by the hand, using a second arithmetic processor, wherein in a case where three or more finger positions are measured, the target palm area is set such that the target palm area falls within a triangle having a finger position or an intermediate position of a pair of finger positions as an apex thereof, a relative magnitude of the finger pressure of a single finger mechanism or the resultant force of a pair of finger mechanisms corresponding to one end of a long side of the triangle and the finger pressure of a single finger mechanism or the resultant force of a pair of finger mechanisms corresponding to the other end of the long side of the triangle thereby to displace the load center in the palm portion in a direction parallel to the long side is adjusted, and the relative magnitude of the finger pressure of a single finger mechanism or the resultant force of a pair of finger mechanisms corresponding to the apex of the triangle opposing the long side and the resultant force of the finger pressures of the plurality of finger mechanisms corresponding to both ends of the long side, thereby changing the load center in the palm portion in a direction perpendicular to the long side, using a second arithmetic processor is adjusted.

* * * * *